(12) United States Patent
Dajek

(10) Patent No.: US 12,179,399 B2
(45) Date of Patent: Dec. 31, 2024

(54) HOLLOW-PROFILE COMPOSITE TECHNOLOGY

(71) Applicant: LANXESS Performance Materials GmbH, Cologne (DE)

(72) Inventor: Ulrich Dajek, Leverkusen (DE)

(73) Assignee: LANXESS PERFORMANCE MATERIALS GMBH, Cologne (DE)

( * ) Notice: Subject to any disclaimer, the term of this patent is extended or adjusted under 35 U.S.C. 154(b) by 266 days.

(21) Appl. No.: 17/639,495

(22) PCT Filed: Aug. 28, 2020

(86) PCT No.: PCT/EP2020/074110
§ 371 (c)(1),
(2) Date: Mar. 1, 2022

(87) PCT Pub. No.: WO2021/043683
PCT Pub. Date: Mar. 11, 2021

(65) Prior Publication Data
US 2022/0305706 A1    Sep. 29, 2022

(30) Foreign Application Priority Data
Sep. 2, 2019  (EP) .................... 19194862

(51) Int. Cl.
*B29C 45/14* (2006.01)
*B29C 45/00* (2006.01)
*B29K 101/12* (2006.01)
*B29L 31/30* (2006.01)

(52) U.S. Cl.
CPC .... *B29C 45/14622* (2013.01); *B29C 45/0001* (2013.01); *B29C 45/1418* (2013.01); *B29C 45/14778* (2013.01); *B29K 2101/12* (2013.01); *B29K 2995/0097* (2013.01); *B29L 2031/3002* (2013.01)

(58) Field of Classification Search
CPC ..................... B29C 45/1418; B29C 45/14778
See application file for complete search history.

(56) References Cited

U.S. PATENT DOCUMENTS

| | | | |
|---|---|---|---|
| 5,934,744 A | 8/1999 | Jergens et al. | |
| 6,241,619 B1 * | 6/2001 | Russell | F16C 3/026 464/181 |
| 6,881,494 B2 | 4/2005 | Gehrig et al. | |
| 7,381,174 B2 | 6/2008 | Noda et al. | |

(Continued)

FOREIGN PATENT DOCUMENTS

| | | |
|---|---|---|
| DE | 3638958 A1 | 5/1988 |
| DE | 19747021 A1 | 4/1999 |

(Continued)

OTHER PUBLICATIONS

European Search Report from corresponding European Application No. 19194862, dated Feb. 26, 2020, three pages.

*Primary Examiner* — Edmund H Lee
(74) *Attorney, Agent, or Firm* — NIXON & VANDERHYE P.C.

(57) ABSTRACT

The invention relates to a process for producing a composite component having at least one functional element composed of at least one cylindrical hollow profile and at least one plastic to be introduced into the hollow profile by means of specific injection molding methods.

16 Claims, 12 Drawing Sheets

(56) References Cited

U.S. PATENT DOCUMENTS

| | | |
|---|---|---|
| 8,534,739 B2 | 9/2013 | Busuioc et al. |
| 9,555,569 B2 | 1/2017 | Birka |
| 9,962,753 B2 | 5/2018 | Lerch et al. |
| 10,773,432 B2 | 9/2020 | Koch |
| 2013/0092226 A1 | 4/2013 | Pawlik et al. |
| 2018/0250855 A1* | 9/2018 | Koch ................ B29C 45/14598 |

FOREIGN PATENT DOCUMENTS

| | | |
|---|---|---|
| DE | 102008046602 A1 | 3/2010 |
| DE | 102011010997 | 8/2012 |
| DE | 102011112913 A1 | 3/2013 |
| DE | 102014226500 A1 | 6/2016 |
| DE | 202018001599 U1 | 11/2018 |
| EP | 2830848 | 2/2015 |
| EP | 3369544 | 9/2018 |
| JP | 7223236 A2 | 8/1995 |
| JP | 8-312757 | 11/1996 |
| JP | 08312757 A | 11/1996 |
| JP | 2008-150218 | 3/2008 |
| WO | 01/87568 A1 | 11/2001 |
| WO | 2009/077026 A1 | 6/2009 |
| WO | WO2013/148959 | 10/2013 |
| WO | WO19034208 A1 | 2/2019 |

\* cited by examiner

HOLLOW-PROFILE COMPOSITE TECHNOLOGY

CROSS-REFERENCE TO RELATED APPLICATIONS

This application is the U.S. national phase of International Application PCT/EP2020/074110 filed on Aug. 28, 2020, which claims priority from EP Application No. 19194862.9 filed on Sep. 2, 2019.

FIELD

The invention relates to a process for producing a composite component having at least one functional element composed of at least one cylindrical hollow profile and at least one plastic to be introduced into the hollow profile by means of specific injection molding methods.

BACKGROUND AND SUMMARY

Even now, there are many cases of use of composite components in motor vehicle construction. They are usually produced from a metallic closed hollow profile that is bonded to at least one separately produced plastic element. The production of two separate components and finally the bonding of these at least two components leads to an elevated level of manufacturing and assembly complexity. For bonding of the hollow profile to the plastic element(s), moreover, additional bonding means in the form of screws, nuts, rivets or the like are required, which generally in turn requires more construction space and leads to higher weight of the composite component.

Comparable composite components consisting of plastic alone—i.e. both hollow profile and plastic element are made of plastic—given acceptable dimensions of the cross sections show lower strengths and stiffnesses, but also disadvantages in the absorption of energy under abrupt stress, compared to equivalent components made of metallic materials.

WO 01/87568 A1 describes a process for producing a molding from a metal/plastic composite by hydroforming of semifinished tubular metal material, for the purpose of which the semifinished material is inserted into an at least two-part mold having a mold space corresponding to the outline of the molding, the mold is closed, and the semifinished tubular material is sealed pressure-tight at its open end faces and is shaped into the mold space under high pressure with a polymer melt from at least one end face. The polymer melt is forced into the semifinished material by injection molding by means of a conventional injection molding system. After sufficient solidification of the polymer melt in the wall region of the metallic molding, the polymer melt is displaced from the molding, so as to obtain a metallic molding having an internal plastic coating.

The invention of EP 3369544 A1 relates to a process for producing a composite component from at least one hollow profile base structure and at least one support element positioned in the interior of the at least one hollow profile base structure.

WO 2009/077026 A1 describes a process for producing a composite component from a hollow profile and an injection-molded element, wherein the injection-molded element is molded externally onto the hollow profile, such that the hollow profile is captively gripped in peripheral direction, wherein at least one form-fitting element is formed in the hollow profile and is included in the injection-molding operation in that the form-fitting element between the ends of the hollow profile is shaped or molded in a restricted manner in terms of peripheral direction and longitudinal extent to give the hollow profile.

EP 3369544 A1 relates to a process for producing a composite component from at least one hollow profile and at least one support element to be positioned within the at least one hollow profile, wherein a plastic is applied to the hollow profile from the outside.

DE 202018001599 U1 describes a demonstrator based on a cylindrical hollow profile, surrounded in the form of a ring by two arms in a mutually opposite arrangement at 180°, with variances in the range of +/−10%, wherein the arms are mounted on the hollow profile by external application of plastic by means of injection molding.

A disadvantage of the processes described in the prior art is that the external application of plastic to the hollow profile can lead to local collapse of the hollow profile wall, or to uncontrollable penetration of plastic into the hollow profile through intentional perforations in the hollow profile wall. A considerable disadvantage is additionally that it is not possible to process hollow profiles having bends, especially bends of 90°. In the case of hollow profiles having bends, the introduction of support bodies as in the case of EP 3369544 A1 and hence avoidance of the collapse of the hollow profile is not possible on account of the injection pressure or compression pressure. A disadvantage of the process of EP 3369544 A1 is additionally the upstream step for production of suitable support elements that have to be individually matched and prefabricated with respect to the hollow profile to be used in each case.

It was therefore an object of the present invention to provide a process for producing composite components based on at least one thin-wall hollow profile having at least one bend and at least one functional element to be produced by means of injection molding, wherein the at least one functional element is bonded to the hollow profile both radially and in an axially form-fitting and mechanically stiff manner.

"Thin-wall" in the context of the present invention, with regard to a hollow profile for use in accordance with the invention, preferably means a ratio of diameter to wall thickness of the hollow profile in the range from 5:1 to 300:1.

Moreover, composite components to be produced in accordance with the invention should have the abovementioned disadvantages to a distinctly reduced degree, if at all, in terms of manufacture or disadvantages in terms of strength and stiffness properties, and hence also in terms of energy absorption characteristics, and should permit a high degree of functional integration for the purposes of system or module formation in economically viable manufacture.

BRIEF DESCRIPTION OF THE DRAWINGS

Particularly preferred embodiments are described with reference to the figures that follow, with the composite component always being one formed from a hollow profile (1) in the form of a hollow cylinder with at least one bend and a plastic coating applied to the inside (7) of the hollow profile (1), and the hollow profile (1) having at least one functional element (3) connected directly to the plastic coating introduced by means of GIT or FIT or a combination of GIT and FIT on the inside of the hollow profile via at least one perforation (2) in the hollow profile (1).

DETAILED DESCRIPTION

Figure 1:
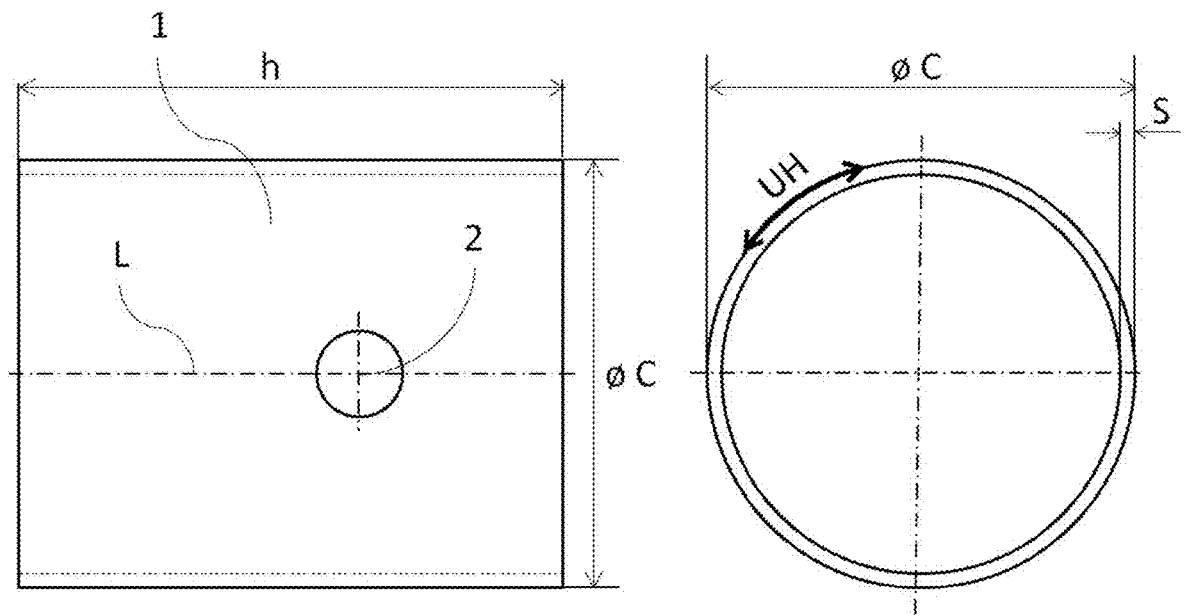
FIG. 1 shows an unbent section of a hollow profile (1) for use in accordance with the invention in the form of a hollow cylinder having a center axis (L), the external diameter (C), the wall thickness (S), a perforation (2) and the hollow profile circumference UH.
Figure 2:
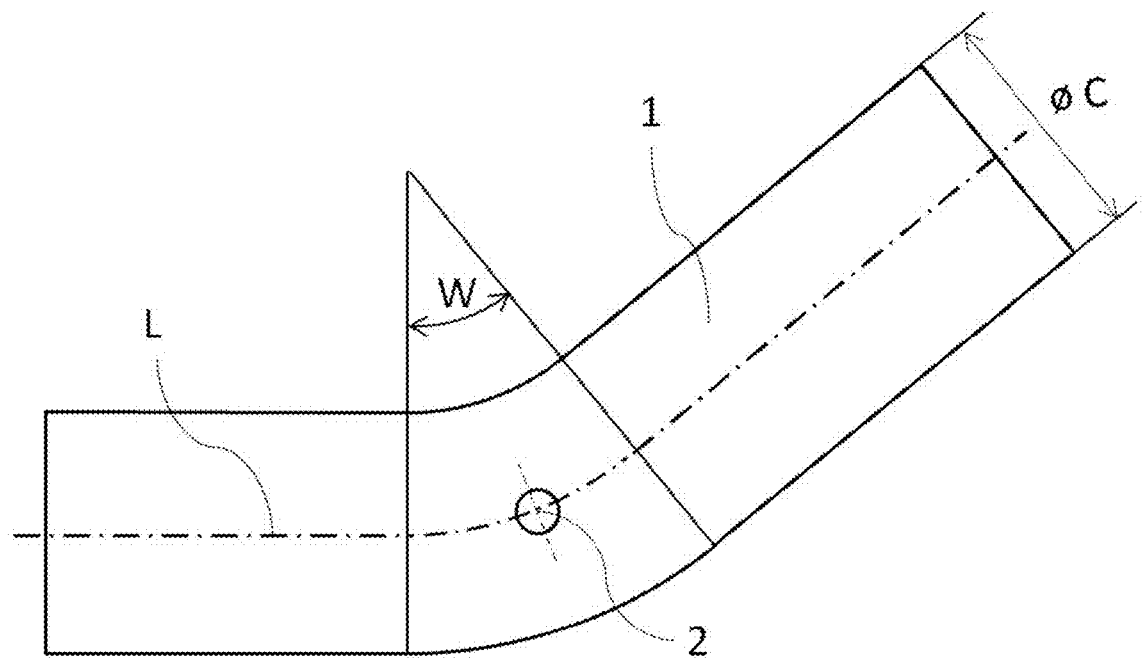
FIG. 2 shows a hollow cylinder to be used as hollow profile (1) with a bend having angle (W) along its centre axis (L) and a perforation (2).
Figure 3:
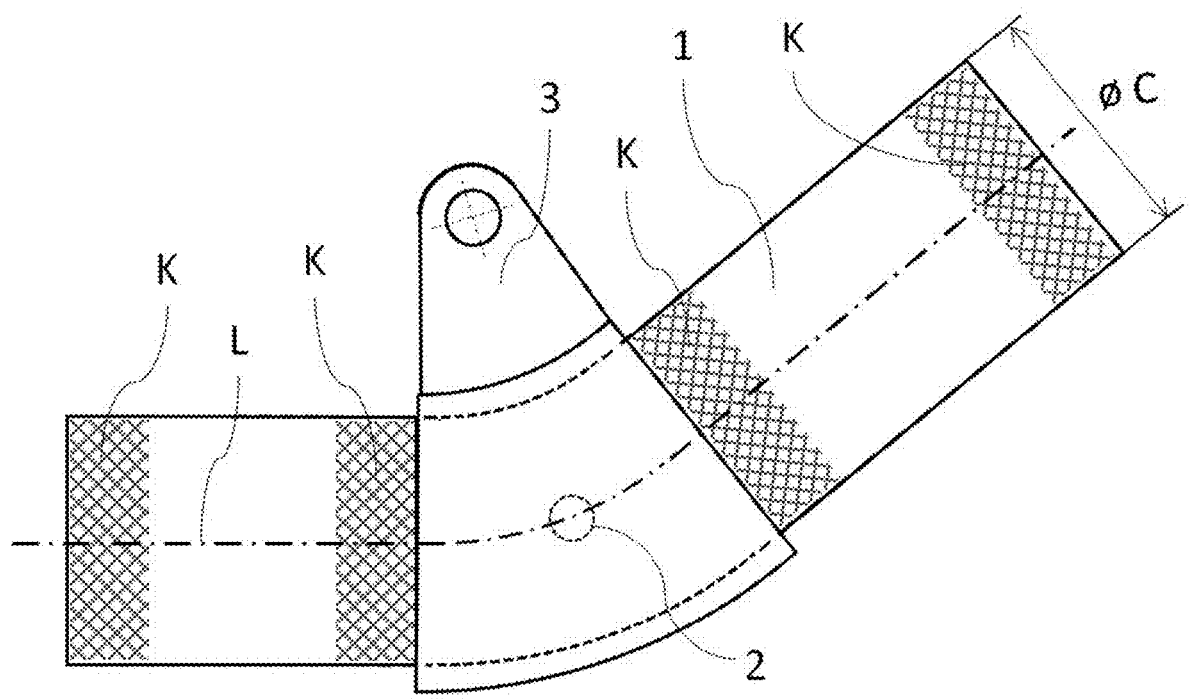
FIG. 3 shows a composite component of the invention, based on a hollow profile (1) according to FIG. 2 with a molded-on functional element (3) and the mold contact surfaces (K) on the hollow profile (1).
Figure 4:
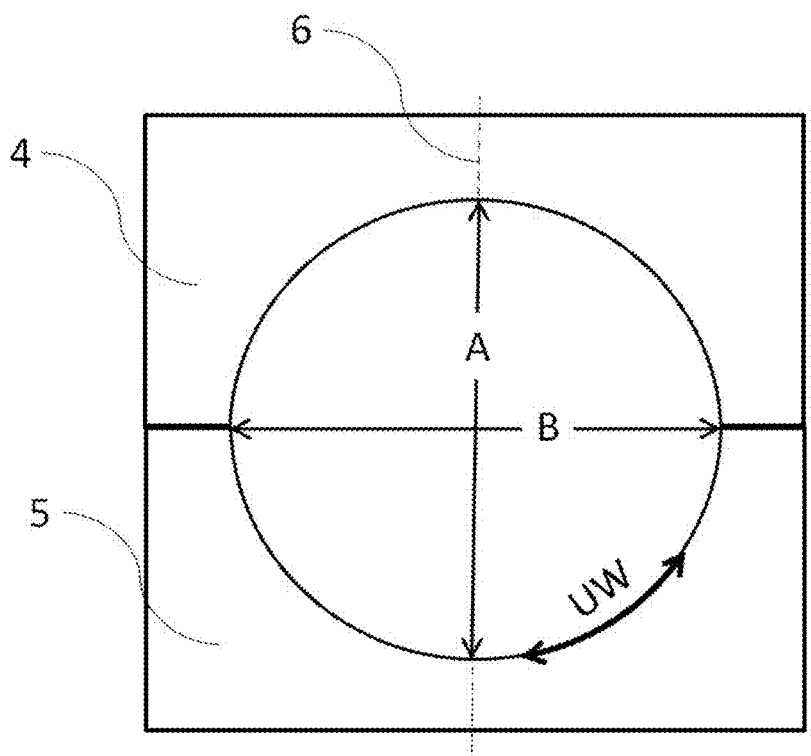
FIG. 4 shows the cross section of an injection mold to be used in accordance with the invention of the contact surfaces with the mold half (4) and the mold half (5) in the closed state. The mold dimension (A) is 0.1% to 5% smaller than the external diameter (C), the mold dimension (B) is 0.1% to 5% greater than the external diameter (C), and the cavity circumference (UW) is equal to the hollow profile circumference (UH); where: UH=C·π.
Figure 5:
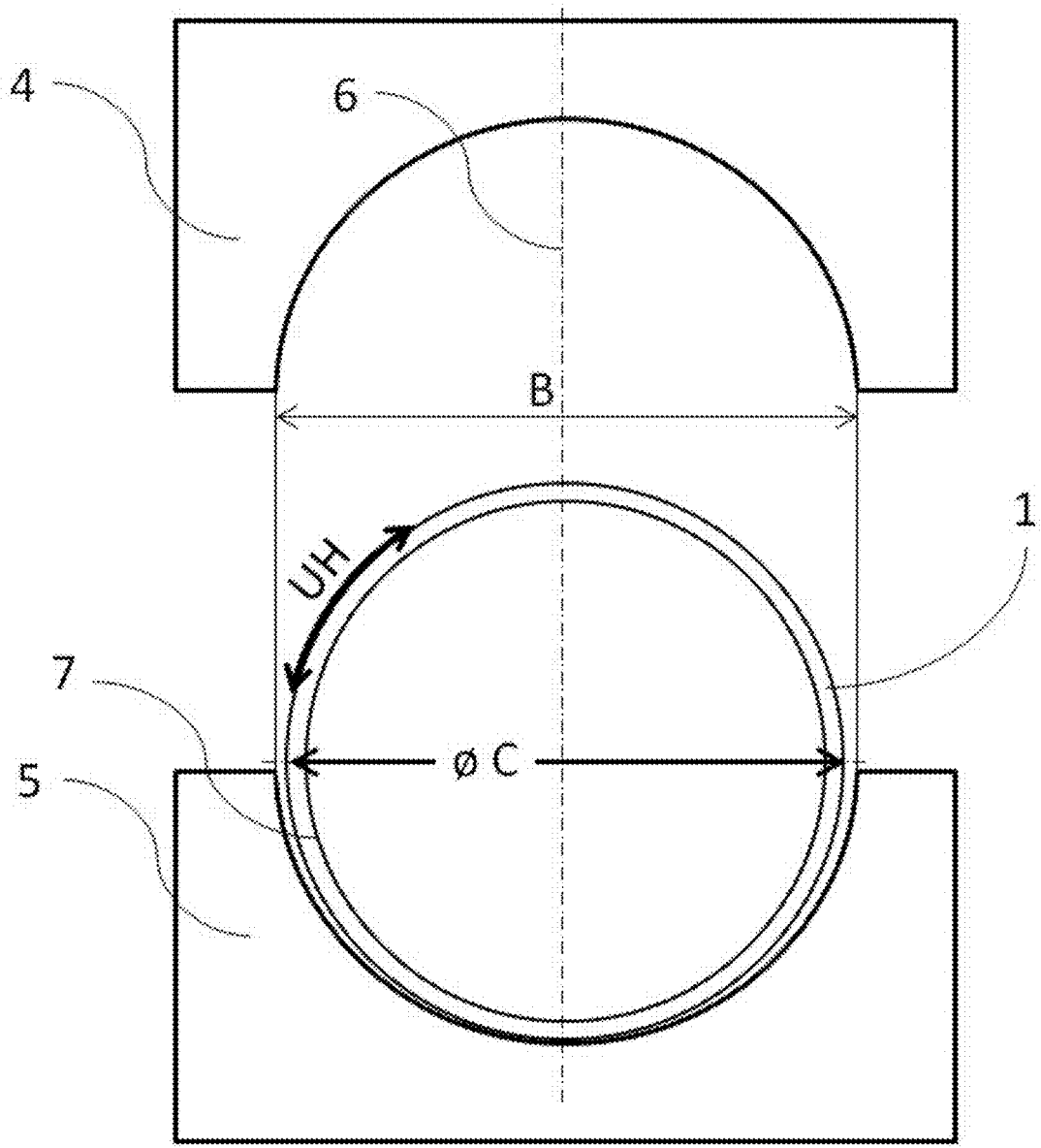
FIG. 5 shows the cross section of an injection mold to be used in accordance with the invention with the mold halves (4) and (5) in the open state at the mold contact surfaces with inserted hollow profile (1) and its inner surface (7) that is to be coated by spraying with plastic. (6) represents mold closure direction. For the hollow profile circumference: UH=C·π. The mold dimension (B) is 0.1% to 5% greater than the external diameter (C).
Figure 6:
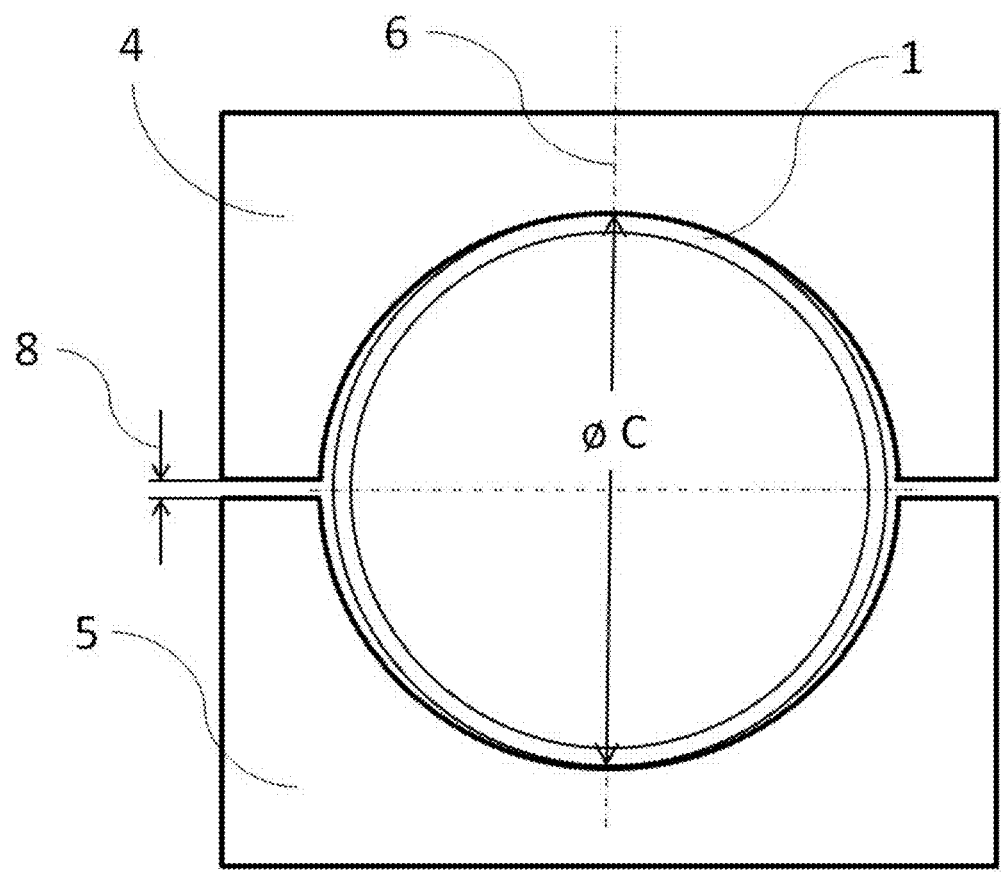
FIG. 6 shows the position of a hollow profile (1) to be used in accordance with the invention at the mold contact surfaces on closure of the mold when the hollow profile (1) comes into contact for the first time with the mold of the invention having the mold halves (4) and (5). At this time, a mold gap (8) is still open.
Figure 7:
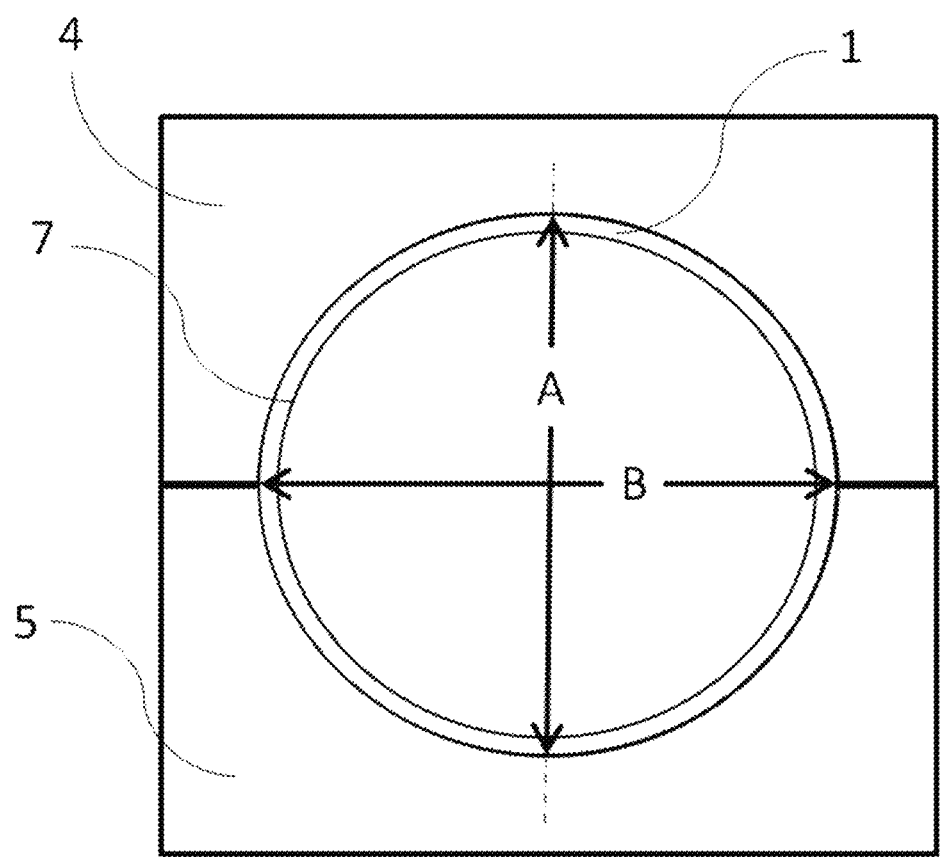
FIG. 7 shows the position and shape of a hollow profile (1) to be used in accordance with the invention of the mold contact surfaces with respect to the mold of the invention having mold halves (4) and (5) when the mold is completely closed. The hollow profile 1 with the original external diameter © is/has been compressed at the mold contact surfaces (K) into the mold cavity with the mold dimension (A) and the mold dimension (B).
Figure 8:
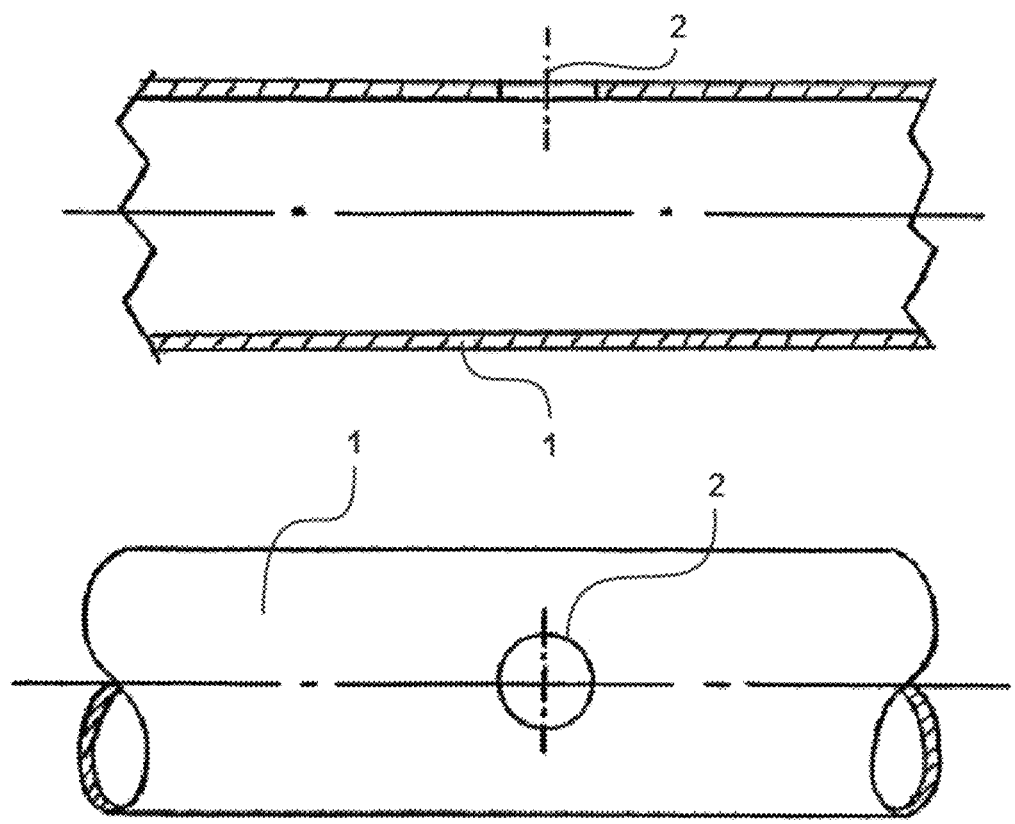
FIG. 8 shows the section of a hollow profile (1) without a bent section that is to be provided prior to process step b) in accordance with the invention, but with a circular perforation 2 for the purpose of molding on at least one functional element (3).
Figure 9:
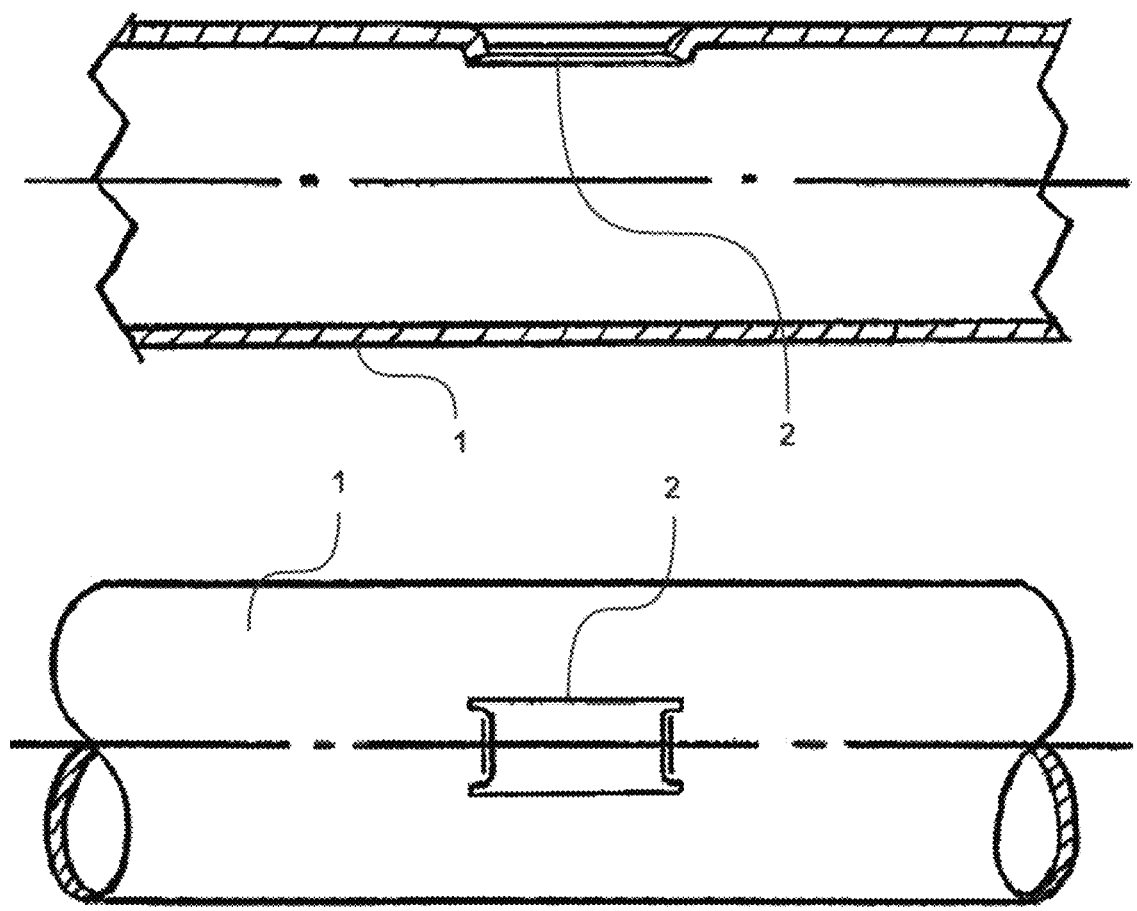
FIG. 9 shows an alternative embodiment of FIG. 8: an unbent region of a hollow profile (1) having a rectangular perforation (2) which is to be provided prior to process step b). The short sides of the rectangular opening are crimped inward in order to assure improved form-fitting with the plastic to be injected into the hollow profile (1) in process step e).
Figure 10:
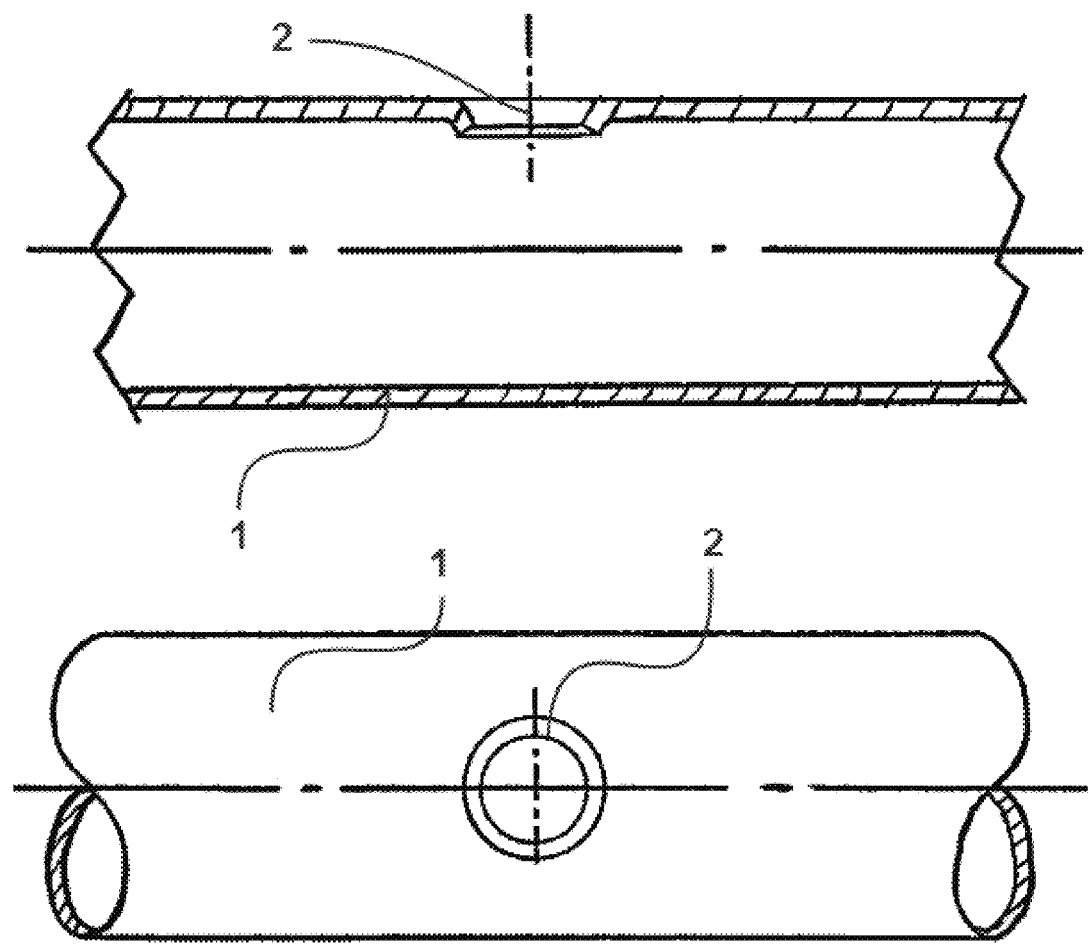
FIG. 10 corresponds essentially to the representation in FIG. 8 and shows a circular perforation (2), the edge of which is crimped inward, in order to assure improved form-fitting with the plastic to be injected into the hollow profile (1) in process step e).
Figure 11:
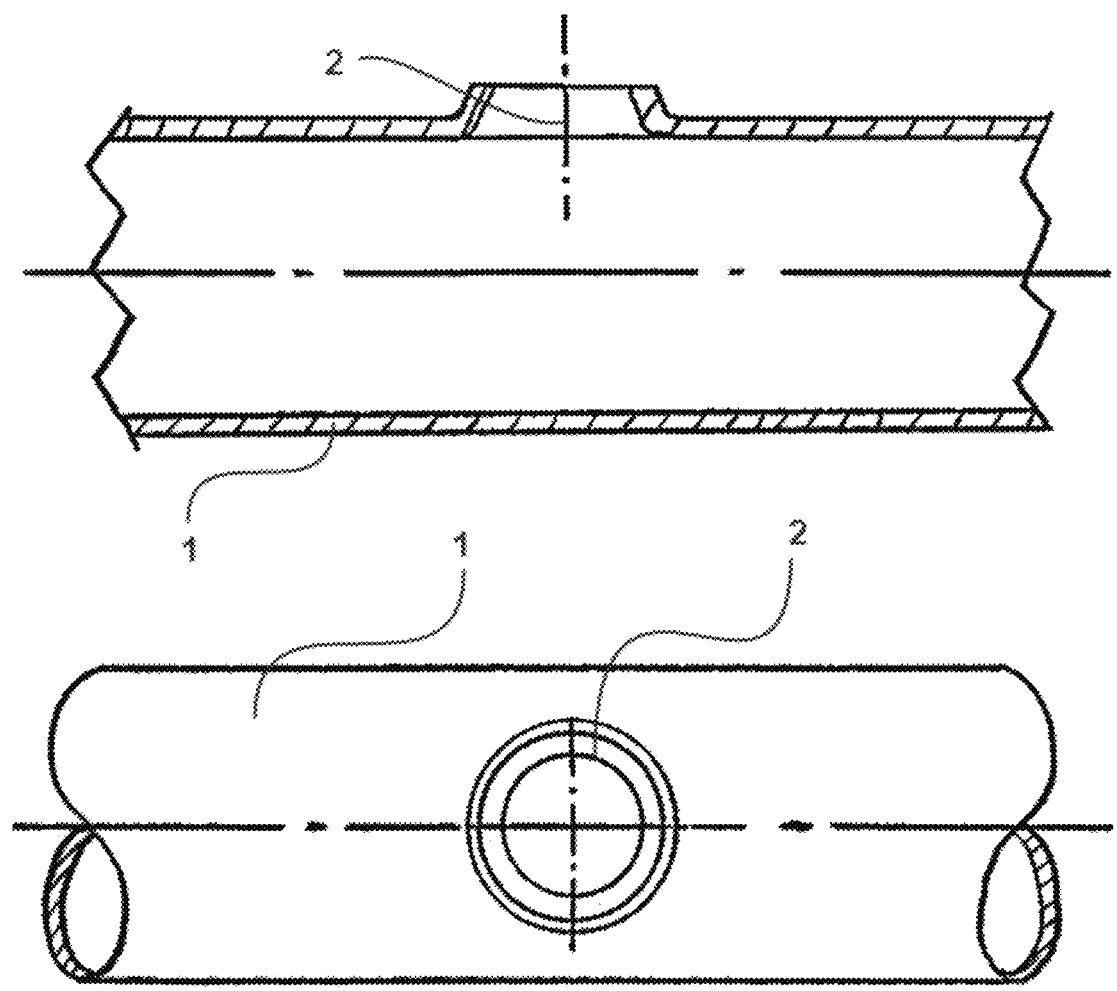
FIG. 11 corresponds essentially to the representation in FIG. 8 and shows a circular perforation (2), the edge of which is crimped outward, in order to assure improved form-fitting with the plastic to be injected into the hollow profile (1) in process step e).
Figure 12:
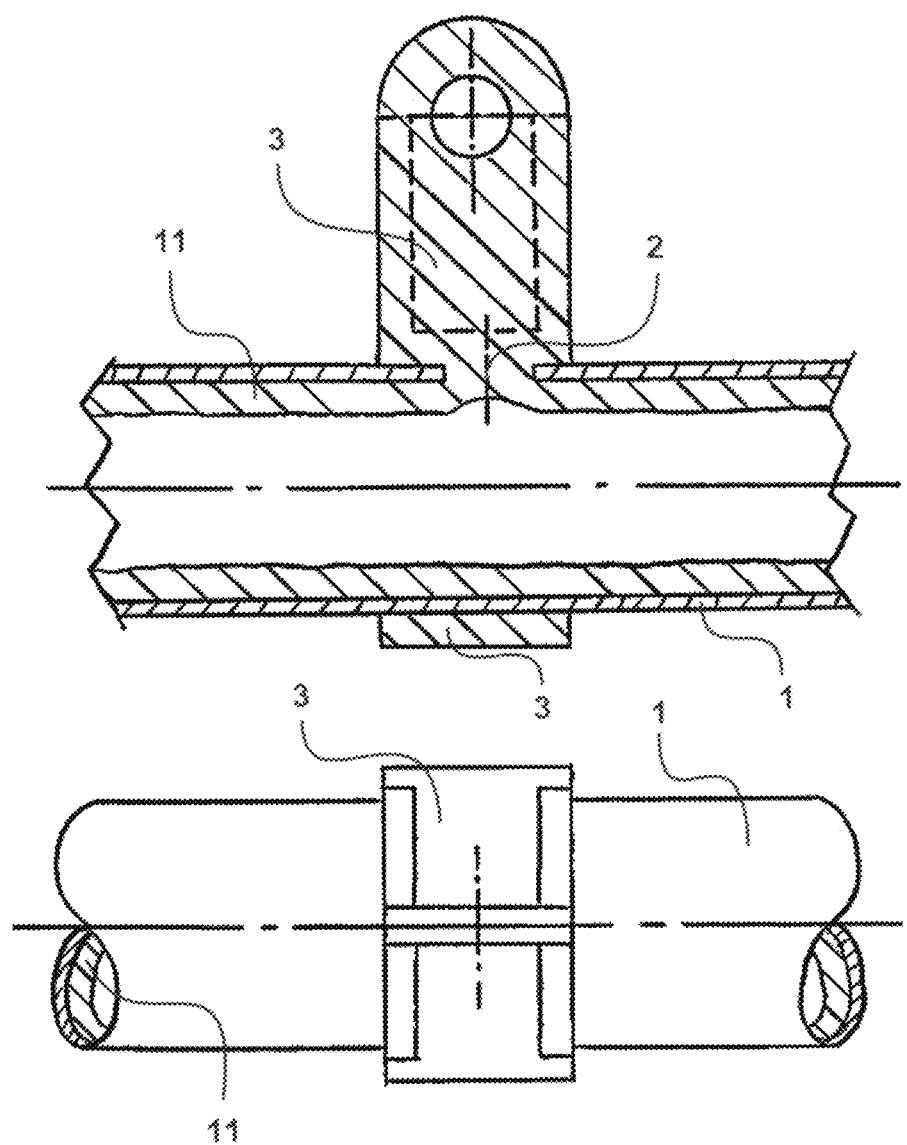
FIG. 12 shows the region of a composite component without a curved section, based on a hollow profile (1) having a circular perforation (2) and a molded-on functional element (3). After the injection of the plastic and the blowing-out of excess plastic with gas in process step f), an inner plastic coating (11) remains within the hollow profile, i.e. on the wall of the inner surface (7).
Figure 13:
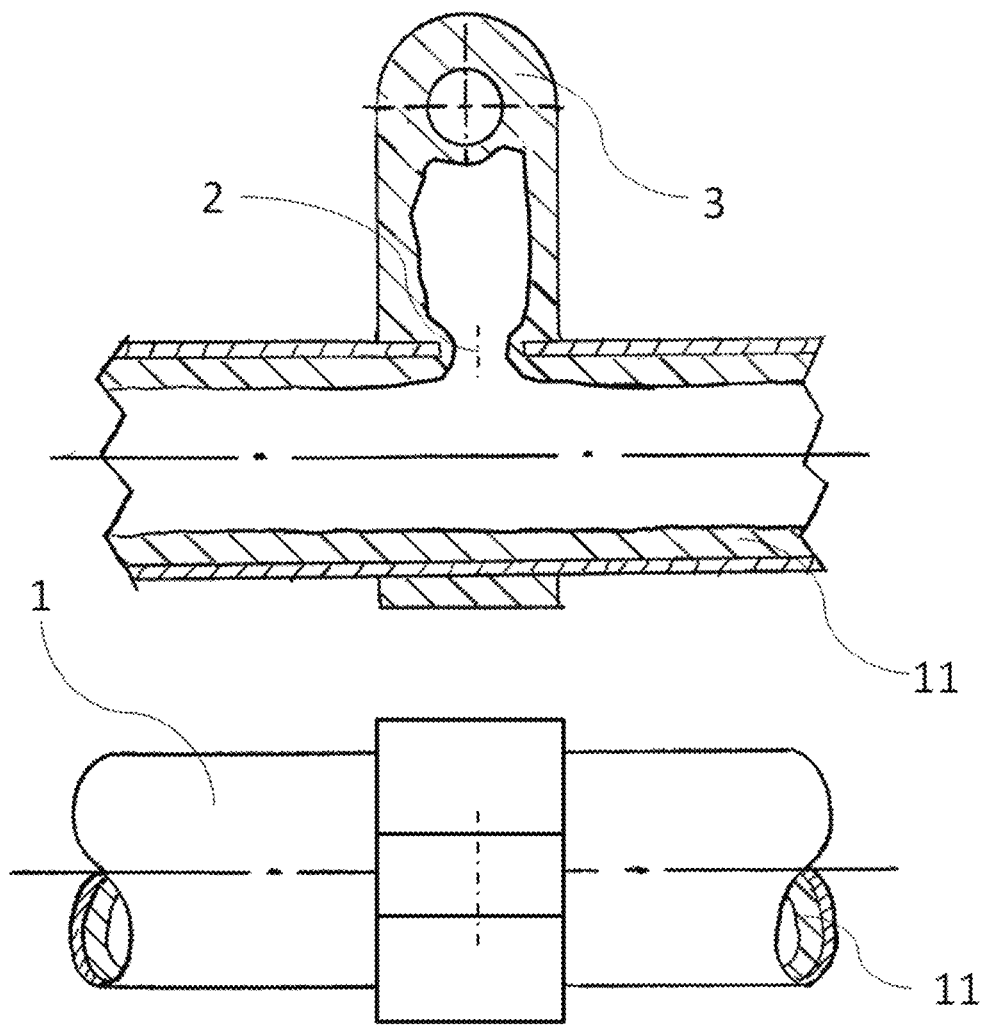
FIG. 13 shows the region of a composite component without a curved section, based on a hollow profile (1) having a circular perforation (2) and a molded-on functional element (3). After the injection of the plastic and the removal of excess plastic with gas in process step f), an inner plastic coating (11) remains within the hollow profile, i.e. on the wall of the inner surface (7). The molded-on functional element (3) is also blown out according to the representation in FIG. 13.
Figures 14A, 14B:
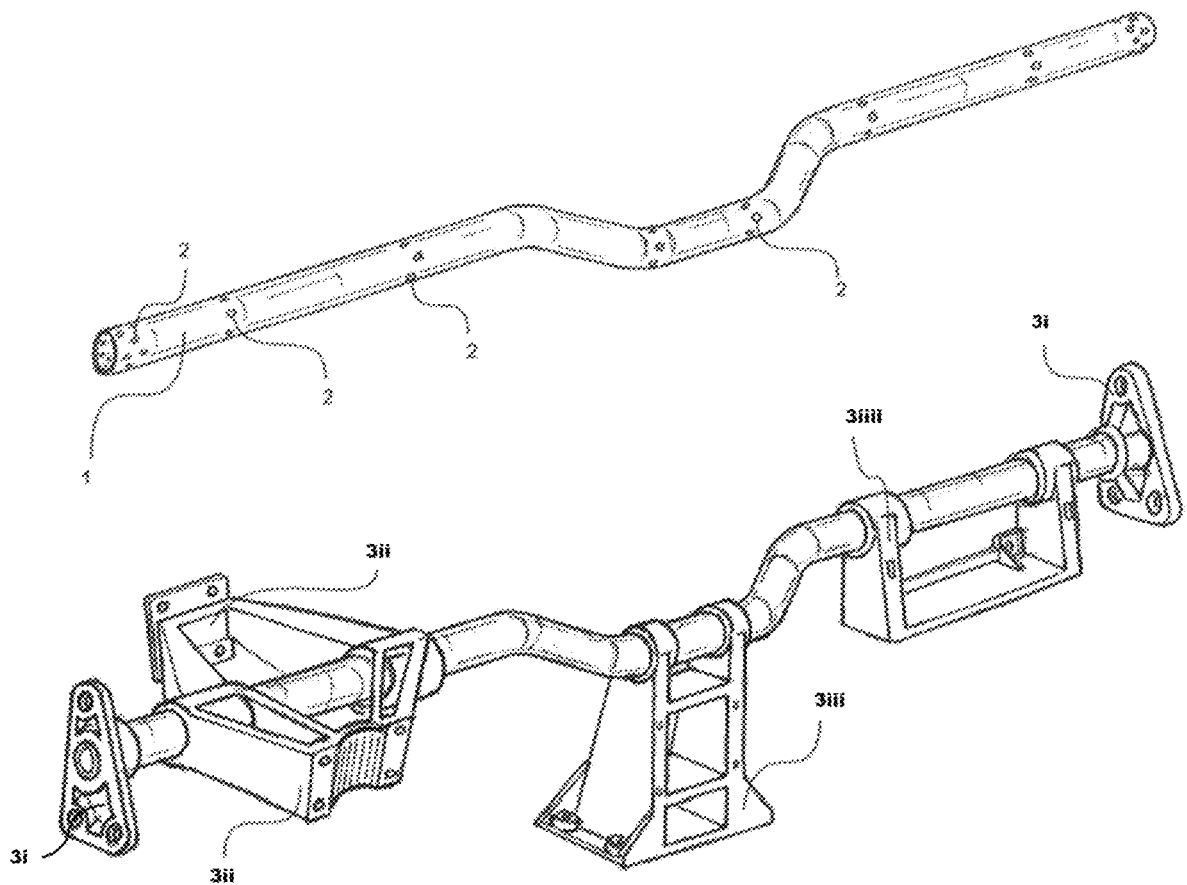
FIG. 14a shows a hollow profile 1 with four bends and numerous perforations (2).
FIG. 14b shows a composite component of the invention, configured as a dashboard crossbeam based on a hollow profile (1) according to FIG. 14a with four bends and six molded-on functional elements (3), of which (3i) represents a securing element to the A pillars (left and right), (3ii) represents a brace to the bulkhead, (3iii) represents a securing element for the steering column, (3iiii) represents a brace to the center console with integrated receptacles for infotainment and climate control system, and (3iiiii) represents a mount and receptacle for glovebox and airbag.

The object is achieved by a process for producing a composite component by
a) providing an injection mold having at least one openable cavity and a mold dimension A in closure direction and a mold dimension B at right angles to the closure direction of the mold and a cavity circumference UW corresponding to the circumference of the cavity in the region of mold dimensions A and B, and at least one secondary cavity,
b) providing at least one hollow profile in the form of a hollow cylinder having
  i) the hollow profile circumference UH, the wall thickness S, the external diameter C and the longitudinal axis L,
  ii) at least one bend with angle W and
  iii) at least one perforation 2 along its longitudinal axis L,
  and in unbent regions of the hollow profile
  iv) having a ratio of external diameter C to wall thickness S in the range from 5:1 to 300:1, where the external diameter C in the region of the mold contact surfaces is greater by a range from 0.1% to 5% than the mold dimension A and is less by a range from 0.1% to 5% than the mold dimension B, and
  v) the figures for external diameter C are based on 90° viewed in the direction of the longitudinal axis L of the hollow profile, and
  vi) the hollow profile circumference UH=C·π corresponds to the cavity circumference UW of the at least one mold cavity in the closed state, and
  vii) the mold contact surfaces K refer to the sealing surfaces of the mold in the closed state with the hollow profile,
c) introducing the at least one hollow profile into the at least one cavity of the injection mold,
d) closing the at least one cavity of the injection mold and compressing the hollow profile at its mold contact surfaces in closure direction of the at least one cavity, e) injecting plastic into the interior of the hollow profile and simultaneously filling the at least one secondary cavity via the at least one perforation 2 in the hollow profile, f) expressing excess plastic through at least one of the two lateral openings in the hollow profile by injecting gas or fluid or a combination of the two, g) cooling down the plastic melt introduced into the hollow profile and into the secondary cavity in e) (solidification), and h) removing the finished composite component from the injection mold and optionally removing sprues, with the proviso that the figures for mold dimension A, for mold dimension B and for cavity circumference UW in process step a) relate to regions of the injection mold in which unbent regions of the hollow profile lie, and the hollow profile is based on metal or on a composite, and the at least one openable cavity together with the at least one secondary cavity constitutes the outline of the composite component and the openable cavity has a tubular shape with at least one bend.

Surprisingly, the process of the invention permits the production of composite components composed of a hollow profile with plastic introduced into the interior of the hollow profile and plastic applied to the inner wall of the hollow profile, which prevents collapse of the hollow profile from the outset. Through at least one perforation 2 provided in the hollow profile, it is additionally possible to fill at least one secondary cavity through the interior of the hollow profile in one injection molding operation, and hence to join at least one functional element to the hollow profile. The process of the invention additionally permits the use of hollow profiles having at least one bend that are not processable by the above-described prior art.

In one embodiment, the present invention relates to a composite component obtainable by a) providing an injection mold having at least one openable cavity and a mold dimension A in closure direction and a mold dimension B at right angles to the closure direction of the mold and a cavity circumference UW corresponding to the circumference of the cavity in the region of mold dimensions A and B, and at least one secondary cavity, b) providing at least one hollow profile in the form of a hollow cylinder having
   i) the hollow profile circumference UH, the wall thickness S, the external diameter C and the longitudinal axis L,
   ii) at least one bend with angle W and
   iii) at least one perforation 2 along its longitudinal axis L,
   and in unbent regions of the hollow profile
   iv) having a ratio of external diameter C to wall thickness S in the range from 5:1 to 300:1, where the external diameter C in the region of the mold contact surfaces is greater by a range from 0.1% to 5% than the mold dimension A and is less by a range from 0.1% to 5% than the mold dimension B, and
   v) the figures for external diameter C are based on 90° viewed in the direction of the longitudinal axis L of the hollow profile, and
   vi) the hollow profile circumference UH=C·π corresponds to the cavity circumference UW of the at least one mold cavity in the closed state, and
   vii) the mold contact surfaces K refer to the sealing surfaces of the mold in the closed state with the hollow profile, c) introducing the at least one hollow profile into the at least one cavity of the injection mold, d) closing the at least one cavity of the injection mold and compressing the hollow profile at its mold contact surfaces in closure direction of the at least one cavity, e) injecting plastic into the interior of the hollow profile and simultaneously filling the at least one secondary cavity via the at least one perforation 2 in the hollow profile, f) expressing excess plastic through at least one of the two lateral openings in the hollow profile by injecting gas or fluid or a combination of the two, g) cooling down the plastic melt introduced into the hollow profile and into the secondary cavity in e) (solidification), and h) removing the finished composite component from the injection mold and optionally removing sprues, with the proviso that the figures for mold dimension A, for mold dimension B and for cavity circumference UW in process step a) relate to regions of the injection mold in which unbent regions of the hollow profile lie, and the hollow profile is based on metal or a composite, and the at least one openable cavity together with the at least one secondary cavity constitutes the outline of the composite component and the openable cavity has a tubular shape with at least one bend.

The invention especially preferably relates to a process for producing a composite component, characterized in that
   a) an at least two-part injection mold having a cavity corresponding to the outline of the composite component,
      having mold contact surfaces (K),
      having the mold half (4) and the mold half (5),
      having at least one cavity to be opened and one mold dimension (A) in closure direction (6) and
      a mold dimension (B) at right angles to the closure direction (6) of the injection mold and
      a cavity circumference (UW) corresponding to the circumference of the at least one openable cavity in the region of the mold dimensions (A) and (B), and
      at least one secondary cavity for a functional element (3) is provided,
   b) at least one hollow profile in the form of a hollow cylinder having
      i) the hollow profile circumference (UH), the wall thickness (S), the external diameter (C), the inner surface (7) and the longitudinal axis (L),
      ii) at least one bend with angle (W) and
      iii) at least one perforation (2) along its longitudinal axis (L),
      and in unbent regions of the hollow profile (1)
      iv) having a ratio of external diameter (C) to wall thickness (S) in the range from 5:1 to 300:1, where the external diameter (C) in the region of the mold contact surfaces (K) is greater by a range from 0.1% to 5% than the mold dimension (A) and is less by a range from 0.1% to 5% than the mold dimension (B), and
      v) the figures for external diameter (C) are based on 90° viewed in the direction of the longitudinal axis (L) of the hollow profile, and
      vi) the hollow profile circumference UH=C·π corresponds to the cavity circumference (UW) of the at least one openable cavity in the closed state, and
      vii) the mold contact surfaces (K) refer to the sealing surfaces of the injection mold in the closed state with the hollow profile (1), c) the at least one hollow profile (1) is inserted into the at least one openable cavity of the injection mold, d) the at least one openable cavity of the injection mold is closed and compresses the hollow profile (1) at its mold contact surfaces (K) in closure direction of the at least one openable cavity, e) plastic is injected into the interior of the hollow profile (1) and the at least one secondary cavity is simultaneously filled via the at least one perforation (2) in the hollow profile (1), wherein the plastic remaining in the hollow profile (1) leaves a plastic coating (11) on the inner surface (7) of the hollow profile (1), f) excess plastic is expressed through at least one of the two lateral openings in the hollow profile (1) by injecting gas or fluid or a combination of the two, g) the plastic melt introduced into the hollow profile (1) and through the perforation (2) into the secondary cavity in process step e) is cooled down, and h) the finished composite component is removed from the injection mold, and sprues are optionally removed, with the proviso that the figures for mold dimension (A), for mold dimension (B) and for cavity circumference (UW) in process step a) relate to regions of the injection mold in which unbent regions of the hollow profile (1) are present, and the hollow profile (1) is based on metal or on a composite, and the at least one openable cavity together with the at least one secondary cavity constitutes the outline of the composite component and the openable cavity has a tubular shape with at least one bend.

The combining of the plastic to be injected into the interior of the hollow profile (1) and the simultaneous fashioning of at least one functional element (3) by means of at least one perforation (2) in the wall of the hollow profile and filling of at least one secondary cavity that seals the perforation (2) gives rise to a form-fitting bond of the hollow profile (1) to the functional element (3) with blocking of all degrees of freedom, translationally in X, Y and Z direction and rotationally about the X, Y and Z axis, and hence shear-resistant and shear-stiff connection at least in an axial direction, preferably in an axial and radial direction, based on the hollow profile (1).

There is no need for subsequent removal of support elements as in the prior art. Instead, excess plastic is removed from the interior of the hollow profile again by injection of gas or liquid prior to the ultimate solidification of the plastic therein.

It should be noted for the avoidance of doubt that all referenced definitions and parameters referred to in general terms or within preferred ranges in any desired combinations are encompassed. Standards cited in the context of this application are considered to mean the version in force at the filing date. The terms injection mold and mold are used synonymously in the context of the present invention.

Compression in process step d) means deformation of the hollow profile in which no increase in size is brought about, but merely a change in shape. In the case of oversizing of the hollow profile circumference (UH) for reasons of tolerance, what is essentially brought about is likewise a change in shape. Toward the end of the mold closure movement, in the context of the present invention, the person skilled in the art may detect a slight decrease in circumference.

A secondary cavity in the context of the present invention is understood to mean at least one cavity to be filled in the injection molding in process step e) for a functional element (3) connected to the plastic within the hollow profile (1).

A perforation in the context of the present invention is understood to mean at least one opening, bore or hole in the wall and at right angles to the longitudinal axis of the hollow profile (1). According to the invention, the at least one perforation (2) in the hollow profile serves for the fashioning of the at least one functional element (3) to be produced by injection molding.

According to the invention, a hollow profile (1) in the form of a hollow cylinder is used. If a straight circular cylinder has a bore along its longitudinal axis, this is referred to as a hollow cylinder. As a consequence of the bore along its longitudinal axis, a hollow profile to be used in accordance with the invention has two open end faces, also referred to as lateral openings in the context of the present invention. For a hollow cylinder, ideally a straight piece of pipe, particular parameters in addition to the longitudinal axis (L) and the external diameter (C) are the hollow profile circumference UH=C· and the wall thickness (S). As a result, corresponding figures in the context of the present invention relate to unbent regions of a hollow profile to be used in accordance with the invention. The hollow profile (1) to be used in accordance with the invention is preferably a tube.

A hollow profile (1) to be used in accordance with the invention in the form of a hollow cylinder, as a result of manufacturing tolerances, in one embodiment, may vary from an ideal circular circumference. In that case, the ratio of the hollow profile circumference (UH) to the inner circumference of the contact surfaces of the injection mold cavity is in the range from 1.001:1 to 1.1:1.

Shear strength is a physical constant that describes the resistance offered by a material to being sheared away, i.e. to separation by forces that attempt to move two adjoining faces in the longitudinal direction. Shear strength is determined by the shear modulus, also called modulus of rigidity. What is meant in the context of the present invention by "bonded to one another in a shear-resistant manner" is a form-fitting bond of the hollow profile to at least one functional element, said bond being shear-stiff in axial direction, preferably in axial and radial direction, of the hollow profile.

Shear stiffness is the product of the shear modulus G of a material and the cross-sectional area A:

$$\text{Shear stiffness} = G \cdot A \cdot \kappa (= G \cdot A_s)$$

The cross section-dependent correction factor $\kappa$ takes account of the inhomogeneous distribution of shear stress $\tau$ over the cross section. Shear stiffness is often also expressed in terms of the shear area $A_s$.

Form-fitting bonds in the context of the present invention arise through the intermeshing of at least two bonding partners that enter into an inextricable bond with one another and can only be separated from one another again by destruction.

In a preferred or alternative embodiment, the at least one perforation (2) is introduced before, during or after process step b) in the form of a hole or bore, preferably in the form of multiple holes or bores, from the outside into the wall of the hollow profile (1) at positions where at least one functional element (3) is provided. In this case, the injection mold cavity is adapted correspondingly prior to process step a).

In a preferred or alternative embodiment, the person skilled in the art is free to assist the bonding of a functional element (3) fashioned simultaneously into the hollow profile by means of injection molding to the hollow profile (1) by additional measures. Such measures include the introduction of beads, holes or bores into the hollow profile wall, or the application of additional anchoring elements.

In the case of process step f), at least one gas or one fluid is injected. In the case where gas is used, preference is given to making use of the GIT process (GIT=gas injection technology), in which no separate pressure-tight sealing at the injection site of the gas is required because the gas bubble is injected directly, preferably by means of an injector needle, into the hot core of the melt of the plastic to be injected in process step e). The same applies if a fluid, preferably water, is used. Water injection technology is also called water internal pressure injection molding (WID). In principle, it corresponds to gas injection technology, except that water is injected into the freshly injected plastic with the aid of an injector rather than gas.

Process Step a)

Process step a) comprises the providing of an injection mold having at least one openable cavity and a mold dimension (A) in closure direction and a mold dimension (B) at right angles to the closure direction of the mold and a cavity circumference UW corresponding to the circumference of the cavity in the region of mold dimensions (A) and (B), and at least one secondary cavity. According to the invention, the closure direction (6) relates to the injection mold to be used, and the figures for mold dimension (A), mold dimension (B) and cavity circumference (UW) relate to regions of the injection mold where unbent regions of the hollow profile (will) lie.

Preferably, an injection mold for use in accordance with the invention has two mold halves. According to the configuration of the composite component to be manufactured, however, the mold halves, in a preferred embodiment, may in turn consist of multiple segments. The person skilled in the art will adapt the design of the injection mold to be used in accordance with the composite component to be manufactured. A summary of injection molds to be provided in accordance with the invention in process step a) and of manufacturers thereof can be found, inter alia, in W. Michaeli, G. Menges, P. Mohren, Anleitung zum Bau von SpritzgießWerkzeugen [How to Make Injection Molds], 5th Fully Revised Edition, Carl Hanser Verlag Munich Vienna 1999 (English Edition 2001).

Preferably, an injection mold for use in accordance with the invention has the following features in order that a hollow profile (1) for use in accordance with the invention with all its dimensional and shape tolerances can be inserted without force into the injection mold:

I. The injection mold must be such that it closes the injection mold cavities with respect to the regions of the hollow profile (1) in which no functional element is provided on closure of the mold. For this purpose, in the injection mold, both at the axial ends of the injection mold cavities and around the functional element (3) to be injection-molded, the mold needs to have contact surfaces (K) that compress the hollow profile during the closure of the injection mold from its external diameter (C) to the mold dimension (A), which simultaneously alters the external diameter (C) to the mold dimension (B) at right angles thereto.

II. In a preferred embodiment, the contact surfaces of the at least two mold halves with respect to the hollow profile (1) in the injection mold are executed such that the hollow profile, over and above the compression described in I., is additionally compressed into a shape by a range from −0.01 to −1% of mold dimension (A) and mold dimension (B).

III. The contact surfaces of the at least two mold halves in the injection mold that have been mentioned in I. and II., with the mold closed, enclose the hollow profile (1) in unbent regions over its entire extent and preferably have a width, i.e. an extent viewed in axial direction of the hollow profile (1), in the range from 1.0 to 10.0 mm.

IV. In one embodiment, the contact surfaces of the at least two mold halves with respect to the hollow profile (1) in the injection mold are executed such that these regions in the mold are constituted by hardened inserts. Preferably, the hardened inserts have a Rockwell hardness in the range from 50 to 62 HRC. The hardness is thus within the region of customary bending and punching tools.

V. The injection mold must offer a clearance around the hollow profile (1) outside the injection mold cavities between its contact surfaces with the hollow profile (1). This clearance outside the sealing surfaces is preferably in the range from 2% to 30%, more preferably 2% to 10%, of the nominal hollow profile diameter, preferably of the tube diameter.

In the case of the use of a tube as hollow profile, which is preferred in accordance with the invention, preference is given to providing an oval mold contact surface.

Process Step b)

The hollow profile (1) is formed by the action of bending forces at any position prior to process step b). The at least one bend in the hollow profile (1) to be used in accordance with the invention requires a corresponding adjustment of the injection mold cavity prior to process step a).

In process step b), at least one hollow profile in the form of a hollow cylinder based on metal or based on a composite, especially based on metal, having i) the hollow profile circumference (UH), the wall thickness (S), the external diameter (C), the inner surface (7) and the longitudinal axis (L), ii) at least one bend with angle (W) and iii) at least one perforation (2) along its longitudinal axis (L), and in unbent regions of the hollow profile iv) having a ratio of external diameter (C) to wall thickness (S) in the range from 5:1 to 300:1, where the external diameter (C) in the region of the mold contact surfaces (K) is greater by a range from 0.1% to 5% than the mold dimension (A) and is less by a range from 0.1% to 5% than the mold dimension (B), and v) the figures for external diameter (C) are based on 90° viewed in the direction of the longitudinal axis (L) of the hollow profile, and vi) the hollow profile circumference UH=C·π corresponds to the cavity circumference (UW) of the at least one openable cavity in the closed state, and vii) the mold contact surfaces (K) refer to the sealing surfaces of the injection mold in the closed state with the hollow profile.

A hollow profile (1) for use in accordance with the invention can be produced by various methods, have various cross-sectional shapes and consist of various materials. It is preferably produced using at least one of the following techniques: strand pressing, strand drawing, seamless drawing, longitudinal welding, spiral welding, winding and pultrusion. With regard to composite-based hollow profiles, methods employed with preference for production thereof include RTM (resin transfer molding), vacuum infusion and compression molding. A hollow profile (1) for use with preference in accordance with the invention has a circular or elliptical hollow profile circumference (UH). An elliptical hollow profile circumference for a hollow profile for use in accordance with the invention varies by not more than 10% from an ideal circular hollow profile circumference. Based on a circular hollow profile circumference of diameter 10 cm, this means that an elliptical hollow profile for use in accordance with the invention measures not more than 11 cm in the principal axis and not more than 9 cm in the secondary axis. Preferably, a hollow profile with at least one bend that is to be provided in process step b) has a wall thickness S in the range from 0.1 to 10.0 mm. A hollow profile to be used in accordance with the invention, as well as the two openings at the end faces, additionally has at least one perforation (2) along its longitudinal axis (L) for filling of at least one secondary cavity.

Preferably, hollow profiles based on metal or based on composites that are to be used in accordance with the invention have a longitudinal axis (L) having a length in the range from 60 to 2000 mm for them to be installable into motor vehicles as a composite component having at least one functional element. When giving length figures for bent hollow profiles, the person skilled in the art refers to the "unwound length". The unwound length is the length of the straight tube prior to bending. In principle, hollow profiles having a longer unwound length are alternatively usable in accordance with the invention in order thus to produce longer composite components of the invention. For the metal-based hollow profiles, particular preference is given to using steel, aluminum or alloys of aluminum.

The term "composites" in the context of the present invention relates to the combination of at least one reinforcer with a plastifiable component, the matrix plastic. Depending on the geometry of a composite, a person skilled in the art will distinguish between particulate composites, fiber composites, laminates, penetration composites and structural composites. Fiber composites are divided into short-fiber, long-fiber and continuous-fiber composites. The components of a composite may themselves again be composite materials. In the case of particulate and fiber composites, particles or fibers are embedded into the other component of the composite, called the matrix. In fiber composites, the fibers may run in one or more particular directions or have preferential directions.

Fiber composites may be produced in layers, but as a result are still not laminates if the successive layers are of the same type. However, the term "laminate" is also used here. Laminates consist of different numbers of superposed layers.

In the case of composite-based hollow profiles, preference is given in accordance with the invention to those based on thermoplastics or thermosets as matrix polymer. Plastics used are preferably polyamide (PA), polyalkylene terephthalates, polyethylene (PE), polypropylene (PP) or polyvinylchloride (PVC). The thermoplastic used for a composite-based hollow profile of the invention is preferably polyamide or polyalkylene terephthalate. The polyamide used is preferably a nylon-6. The polyalkylene terephthalate used is preferably polybutylene terephthalate (PBT) or polyethylene terephthalate (PET), especially PBT. Preferred thermosets are epoxy resins, crosslinkable polyurethanes or unsaturated polyester resins.

A hollow profile based on a composite comprises at least one reinforcer as well as the plastic to be used as matrix. Preference is given to using glass fibers as reinforcer. Especially preferably, reinforcers are used in amounts in the range from 10 to 400 parts by mass per 100 parts by mass of the thermoplastic. In one embodiment, a hollow profile to be used in accordance with the invention is based of a thermoplastic-based composite in which the reinforcer comprises essentially weaves or scrims of fiber mats, especially glass fiber mats based on long glass fibers or continuous glass fibers (GFRP). As an alternative, however, it is also possible to use carbon fiber-reinforced plastic-based composites (CFRP), aramid fiber-reinforced plastic-based composites (AFRP), natural fiber-reinforced plastic-based composites (NFRP) and wood-plastic composites (WPC). According to the invention, composite-based hollow profiles are preferably multilayer composite pipes, especially those multilayer composite pipes wherein the aluminum core is surrounded by crosslinked plastic on either side by means of a bonding layer.

Especially preferred, in the case of composite-based hollow profiles, are those produced from a glass fiber-reinforced nylon-6 with 10 to 233 parts by mass of glass fibers per 100 parts by mass of polyamide by an injection molding process.

Polyamide (PA) for use for composite-based hollow profiles may be synthesized from different units and be produced by various methods. In the specific application, the polyamide to be used for this purpose may be used alone or may be modified in the manner known to the person skilled in the art to give materials having specifically adjusted combinations of properties. Also suitable are PA blends having fractions of other polymers, preferably having fractions of polyethylene, polypropylene or acrylonitrile-butadiene-styrene copolymer (ABS), in which case it is optionally possible to use one or more compatibilizers to compensate for phase mismatches that occur in such blends. The properties of the polyamides can be improved if required by addition of elastomers.

A multitude of procedures for production of polyamides are known; depending on the desired end product, different monomer units or various chain transfer agents are used to establish a target molecular weight or else monomers having reactive groups for subsequently intended aftertreatments are used.

Polyamide for use with preference for polyamide-based composites is prepared by polycondensation in the melt; in the context of the present invention, the hydrolytic polymerization of lactams is also regarded as polycondensation.

Polyamide for use with preference in accordance with the invention for the production of composite-based hollow profiles is based on diamines and dicarboxylic acids and/or lactams having at least 5 ring members or corresponding amino acids. Useful reactants preferably include aliphatic and/or aromatic dicarboxylic acids, more preferably adipic acid, 2,2,4-trimethyladipic acid, 2,4,4-trimethyladipic acid, azelaic acid, sebacic acid, isophthalic acid, terephthalic acid, aliphatic and/or aromatic diamines, particularly preferably tetramethylenediamine, hexamethylenediamine, 1,9-nonanediamine, 2,2,4- and 2,4,4-trimethylhexamethylenediamine, the isomeric diaminodicyclohexylmethanes, diaminodicyclohexylpropanes, bisaminomethylcyclohexane, phenylenediamines, xylylenediamines, aminocarboxylic acids, especially aminocaproic acid, or the corresponding lactams. Copolyamides of a plurality of the monomers mentioned are included.

The thermoplastic used in composite-based hollow profiles is more preferably polyamide formed from lactams; for this purpose, very particular preference is given to using caprolactams, especially preferably ε-caprolactam.

Polyamide prepared by activated anionic polymerization or copolyamide prepared by activated anionic polymerization with polycaprolactam as the main constituent may be used in accordance with the invention as matrix polymer for a composite-based hollow profile. Activated anionic polymerization of lactams to afford polyamides is performed on an industrial scale by preparing firstly a solution of catalyst in lactam, optionally together with impact modifier, and secondly a solution of activator in lactam, the two solutions typically having such a composition that combination in an equal ratio affords the desired overall recipe. Further additives may optionally be added to the lactam melt. Polymerization is effected by mixing the individual solutions to afford the overall recipe at temperatures in the range from 80° C. to 200° C., preferably at temperatures in the range from 100° C. to 140° C. Useful lactams include cyclic lactams having 6 to 12 carbon atoms, preferably laurolactam or ε-caprolactam, more preferably ε-caprolactam. The catalyst is an alkali metal or alkaline earth metal lactamate, preferably in the form of a solution in lactam, particularly preferably sodium caprolactamate in ε-caprolactam.

Activators used in the context of the invention may be N-acyllactams or acid chlorides or, preferably, aliphatic isocyanates, more preferably oligomers of hexamethylene diisocyanate. The activator used may be either the pure substance or preferably a solution, preferably in N-methylpyrrolidone.

Particularly suitable polyamides for the production of composite-based hollow profiles as matrix polymers are those having a relative solution viscosity in m-cresol in the range from 2.0 to 4.0, preferably in the range from 2.2 to 3.5, very particularly in the range from 2.4 to 3.1. The figures for relative solution viscosity $\eta_{rel}$ in the context of the present invention are given in accordance with EN ISO 307. The ratio of the outflow time t of the polyamide dissolved in m-cresol to the outflow time t(0) of the m-cresol solvent at 25° C. gives the relative solution viscosity by the formula $\eta_{rel}=t/t(0)$.

Particularly suitable polyamides for the production of composite-based hollow profiles are additionally those having a number of amino end groups in the range from 25 to 90 mmol/kg as matrix polymer, preferably in the range from 30 to 70 mmol/kg, very particularly in the range from 35 to 60 mmol/kg. The amino end groups can be determined by conductometry. In this regard see: Eidgenössische Materialprüfungs-und Versuchsanstalt für Industrie, Bauwesen und Gewerbe, Zürich/St.Gallen, Dr. W. Schefer, Report No. 157, 1954.

Very particular preference is given to using, for the production of composite-based hollow profiles, semicrystalline polyamides or compounds based thereon as matrix polymer. According to DE 10 2011 084 519 A1, semicrystalline polyamides have an enthalpy of fusion in the range from 4 to 25 J/g measured by the DSC method to ISO 11357 in the 2nd heating run and integration of the melt peak. In contrast, amorphous polyamides have an enthalpy of fusion of less than 4 J/g, measured by the DSC method to ISO 11357 in the 2nd heating run and integration of the melt peak.

The polyamide used in accordance with the invention for the production of composite-based hollow profiles is a nylon-6 [CAS No. 25038-54-4] or nylon-6,6 [CAS No. 32131-17-2]. Both are obtainable from Lanxess Deutschland GmbH, Cologne, under the Durethan® name.

In one embodiment, the thermoplastic used for the production of composite-based hollow profiles is at least polyethylene (PE). Polyethylene [CAS No. 9002-88-4] is a semicrystalline and nonpolar thermoplastic. It is possible via the choice of polymerization conditions to adjust the molar mass, molar mass distribution, mean chain length and degree of branching. On the basis of the different density, a distinction is made between four main types, although the abbreviations are not always used uniformly:
high-density polyethylene, PE-HD or HDPE
medium-density polyethylene, PE-MD or MDPE
low-density polyethylene, PE-LD or LDPE
linear low-density polyethylene, PE-LLD or LLDPE.

Polyethylenes to be used as matrix polymer in accordance with the invention are most preferably HDPE or LDPE.

In one embodiment, the thermoplastic used for the production of composite-based hollow profiles is at least polypropylene (PP). PP [CAS No. 9003-07-0] is a semicrystalline thermoplastic and forms part of the group of the polyolefins. Polypropylene is obtained by polymerization of the monomer propene with the aid of catalysts.

In one embodiment, the matrix thermoplastic used for the production of composite-based hollow profiles is at least one polycarbonate (PC). Particular preference is given to using polycarbonates based on 2,2-bis(4-hydroxyphenyl)propane (bisphenol A), bis(4-hydroxyphenyl) sulfone (bisphenol S), dihydroxydiphenyl sulfide, tetramethylbisphenol A, 1,1-bis (4-hydroxyphenyl)-3,3,5-trimethylcyclohexane (BPTMC) or 1,1,1-tris(4-hydroxyphenyl)ethane (THPE). The use of PC based on bisphenol A is especially preferred. PC for use in accordance with the invention is available, for example, under the Makrolon® name from Covestro AG, Leverkusen.

In one embodiment, the matrix thermoplastic matrix used for the production of composite-based hollow profiles is at least polybutylene terephthalate (PBT) [CAS No. 24968-12-5]. PBT forms through polycondensation of the bis(4-hydroxybutyl) terephthalate intermediate. The latter can be prepared by esterification of butane-1,4-diol and terephthalic acid or by catalytic transesterification of dimethyl terephthalate with butane-1,4-diol in the presence of transesterification catalysts, for example tetraisopropyl titanate. PBT for use with particular preference contains at least 80 mol %, preferably at least 90 mol %, based on the dicarboxylic acid, of terephthalic acid residues and at least 80 mol %, preferably at least 90 mol %, based on the diol component, of butane-1,4-diol glycol residues. PBT for use in accordance with the invention is available, for example, under the Pocan® name from Lanxess Deutschland GmbH, Cologne.

In one embodiment, the matrix thermoplastic used for the production of composite-based hollow profiles is at least one polyethylene terephthalate (PET). PET [CAS No. 25038-59-9] is a thermoplastic polymer, prepared by polycondensation, from the family of the polyesters based on the monomers ethylene glycol and terephthalic acid. PET for use with particular preference contains at least 80 mol %, preferably at least 90 mol %, based on the dicarboxylic acid, of terephthalic acid residues and at least 80 mol %, preferably at least 90 mol %, based on the diol component, of ethylene glycol residues. PET can be sourced, for example, from Ticona GmbH in Sulzbach.

In one embodiment, the thermoplastic used for the production of composite-based hollow profiles is at least polyvinylchloride (PVC), [CAS No. 9002-86-2]. Being an amorphous thermoplastic, PVC is hard and brittle and is only made soft, formable and suitable for industrial applications by addition of plasticizers and stabilizers. PVC is known for its use in floor coverings, for window profiles, pipes, for cable insulation and sheathing, and for records. Preference is given in accordance with the invention to using rigid PVC (PVC-U) as typically used for pipes and profiles. Rigid PVC tubes as hollow profile are available, for example, from ThyssenKrupp Plastics Germany, Cologne.

The at least one bend W is preferably introduced prior to process step c) in the hollow profile, preferably pipe, provided, either before or after the introduction of the perforation 2. The at least one bend W preferably has a deflection from the straight longitudinal axis L in the range from 1° to 180°. With adjustment of the injection mold, however, deflections from the straight longitudinal axis of more than 180° are also possible in order to achieve composite components in the form of a screw or arcuate structures. By way of example, forming of a tube is described in DE 19 946 011 A1 that has already been cited above, or in DE 10 2013 212758 A1.

Process Step c)

In process step c), the hollow profile (1) is inserted into the at least one cavity of the injection mold.

As well as the configuration of a hollow profile (1) to be provided in process step b), the configuration of an injection mold to be provided in process step a) is likewise important in order that the process according to the invention, especially the insertion and the sealing of the mold cavity, works without difficulty.

The hollow profile (1) is inserted here into the cavity without extension thereof. The sealing of the join between the hollow profile (1) and the cavity of the injection mold is effected exclusively by a change in shape of the hollow profile circumference (UH), with the circumference of the hollow profile itself remaining the same.

In the case of the preferred use of hollow profiles with a round hollow profile circumference, i.e. in the form of a tube, there is a change in shape, preferably to an ellipse. In the case of use of hollow profiles with elliptical hollow profile circumference, there is preferably a change in shape to a round circumference. Preference is given to fixing a hollow profile to be used in the form of a tube in the injection mold with at least one bracket.

Preferably, the ratio of the hollow profile circumference (UH) to the cavity circumference (UW) of the injection mold at the mold contact surfaces (K) is in the range from 1:1 to 1.1:1.

It is extremely surprising to the person skilled in the art that, even in the case of oversizing, for reasons of tolerance, of the hollow profile circumference (UH) compared to the cavity circumference (UW), the gap or join is reliably closed and hence sealed in respect of the injection molding operation. Oversizing for reasons of tolerance is immaterial in the process of the invention.

Owing to the inventive injection of plastic into the hollow profile (1) in process step e), excess plastic material is not injected into the separation planes of the injection mold. Owing to at least one perforation 2 provided in the hollow profile wall for the purpose of simultaneous configuration of at least one functional element (3) in the hollow profile (1), the plastic first fills the cavity/cavities intended for the purpose. This property of the process of the invention, the change in shape of the hollow profile (1) with the closure of the injection mold, and hence simultaneously the sealing of the injection mold cavity with respect to the outer hollow profile surface, permits the simultaneous configuration of functional element(s) (3) fixedly bonded to the applied plastic that coats the inner surface (7) of the hollow profile (1). No additional process steps are required compared to the prior art, and cycle times are considerably shortened.

Preferably, an injection mold for use in accordance with the invention and also a hollow profile (1) for use in accordance with the invention have the following features in order that the latter with all its dimensional and shape tolerances can be inserted without force into the mold provided in process step a):

I. The characteristics of the injection mold must be such that it seals the second cavities for functional elements when the mold is closed. For this purpose, there is a need for contact surfaces in the injection mold at the axial ends of secondary cavities, which compress the hollow profile (1) from the external diameter (C) to the mold dimension (A) during the closing of the injection mold in closure direction, which simultaneously alters the external diameter (C) at right angles to the closure direction to the mold dimension (B).

II. In one embodiment, the contact surfaces of the at least two halves of the injection mold with respect to the hollow profile (1) in the injection mold are executed such that the hollow profile (1), over and above the compression described in I., is additionally compressed into a shape by a range from −0.01 to −1% of mold dimension (A) and mold dimension (B).

III. The contact surfaces of the at least two injection mold halves in the injection mold that have been mentioned in I. and II., with the mold closed, enclose the hollow profile (1) over its entire extent and preferably have a width, i.e. an extent viewed in axial direction of the hollow profile, in the range from 1.0 to 10.0 mm.

IV. In one embodiment, the contact surfaces of the at least two injection mold halves with respect to the hollow profile in the injection mold are executed such that these regions in the injection mold are constituted by hardened inserts. The hardened inserts preferably have a Rockwell hardness in the range from 50 to 62 HRC. The hardness is thus within the region of customary bending and punching tools. See: de.wikipedia.org/wiki/Rockwell_(Einheit).

V. The injection mold preferably offers a clearance around the hollow profile (1) between its contact surfaces (K) outside the cavities. This clearance is preferably in the range from 1.0 to 10.0 mm.

Process Step d)

In process step d), the injection mold is closed and the hollow profile (1) is compressed in closure direction of the at least one cavity provided for the hollow profile (1). Preferably, the compression is additionally effected at the contact surfaces alongside the secondary cavity/cavities that are described in the remarks relating to process step c) under I.

Preference is given to inserting brackets in the injection mold in order to unambiguously fix or position the hollow profile (1) in the injection mold cavity in process step d). The use of brackets in injection molding is known to the person skilled in the art, for example from DE 3638958 A1.

By means of the contact surfaces (K) described in process step c) in the injection mold, the hollow profile (1) in process step d) is kept unambiguously within the cavity of the injection mold, and the cavities in the hollow profile (1) that are provided for the injection molding are sealed.

The closing of the injection mold and the compression in process step d) require a compression force that presses the hollow profile (1) at its mold contact surfaces (K) into a new shape defined by the configuration of the cavity of the injection mold, and a closing force for the injection molding process in order to seal the at least one cavity for the hollow profile and optionally the at least one secondary cavity for at least one functional element (3). The level of the compression force to be expended in process step d) is guided by the shape of a hollow profile (1) provided in process step b). Moreover, the shape, dimensions and material properties of the hollow profile to be used in accordance with the invention are crucial for the pre-calculation of the compression force to be applied in process step d), which has to be taken into account by the person skilled in the art in the design of the process according to the invention.

By contrast with the prior art, in the process of the invention, the level of the closure force of the injection mold is not guided by the projected area of the applied plastic, since functional elements (3) are concurrently formed directly from the interior of the hollow profile.

In one embodiment, the compression force to be applied for the compression in process step d) is below the closure force of the injection mold.

Preferably in accordance with the invention, the compression in process step d) is effected until: external diameter (C) corresponds to mold dimension (A). This dimension is always established in the case of a completely closed mold. This does not result in any tolerances.

More preferably, the compression in process step d) is effected until: external diameter (C) corresponds to mold dimension (A) and external diameter (C) is compressed to the mold dimension (B) at right angles to closure direction. The hollow profile circumference (UH) corresponds here to the cavity circumference of the mold (UW). In this case, the cavity is circumferentially sealed with respect to the hollow profile.

If it is the case that the external diameter (C) is too small or the cavity circumference of the mold UW is too great and the deformation by the injection mold is insufficient to achieve the outcome of hollow profile circumference (UH) =cavity circumference (UW), this would leave a gap. In this case, the tolerances of the hollow profile have to be chosen such that this case does not occur.

If the chosen external diameter (C) of the hollow profile is too great, the external diameter (C) will reach the mold dimension (B) before the mold is completely closed, which leads to tangential compression of the hollow profile wall. In this case too, therefore, the tolerances of the hollow profile (1) should be chosen such that compression occurs up to a maximum of compressive expansion of the material, but there is no occurrence of deflection of the hollow profile wall into cavities between the separation surfaces of the injection mold.

According to the invention, the outer surfaces are sealed to the ends of the hollow profile (1) via the compression on the contact surfaces.

Process Step e)

In process step e), plastic is injected in the form of a melt. Preference is given to injecting from at least one of the two end faces or lateral openings of the hollow profile (1) or through at least one perforation (2). This pushes the hollow profile (1) from the inside onto the wall of the injection mold. Collapse of the hollow profile (1) as can occur in the prior art through external application of plastic to the hollow profile is ruled out by the process of the invention.

In the process of the invention, in process step e), the molten plastic within the hollow profile (1) flows into the at least one secondary cavity along its wall of the inner surface (7) and through the at least one perforation (2) along its longitudinal axis (L). In this way, in process step e), both the cavity of the hollow profile (1) and the at least one secondary cavity are filled with plastified plastic in one operation. In the case of injection through a perforation 2, at least one further perforation (2) is required for filling of a secondary cavity.

The pressures, temperatures and volumes for the introduction of plastic into the hollow profile that are to be employed in process step e) are dependent on the plastic materials to be used and the geometry of the hollow profile to be filled with plastic, and on the secondary cavity/cavities to be filled with plastic. The amounts of plastic to be used must be taken into account or calculated in advance by the person skilled in the art in the design of the injection molding process of the invention. The injection pressure required to fill the hollow profile (1) with plastic material acts on the inner surface (7) of the wall of the hollow profile (1). The mold contact surfaces (K) are braced from the outside. Between the contact surfaces outside the cavities, the injection mold preferably offers a clearance in the range from 1.0 to 10.0 mm. The dimensions of the hollow profile (1) are preferably such that no bursting takes place as a result of the injection pressure outside the cavities between the mold contact surfaces (K), or the dimensions of the clearance are such that the elongation at break of the hollow profile material is not attained.

The compression of the hollow profile (1) in process step d), especially by means of the mold contact surfaces (K) described in process step c) during the closure of the injection mold, achieves sealing against escape of the plastic introduced in process step e). In one embodiment, the mold contact surfaces (K) are executed in such a way that these regions in the mold are constituted by hardened inserts.

In an alternative or preferred embodiment, by means of a secondary cavity or cavities in appropriate arrangement, bends in the hollow profile (1) are filled with plastic from the inside out via at least one perforation (2) in the hollow profile. In the case of appropriate configuration of this secondary cavity or cavities, it is possible in this way to coat bends in the hollow profile (1) with plastic either from the inside or from the outside of the hollow profile (1), which additionally stabilizes a composite component having bend(s), especially at the bend positions.

The execution of hardened mold inserts described in the details of process step c) under point IV. serves, in process step e), to reduce the wear on the mold contact surfaces (K) since these are the only contact sites between injection mold and hollow profile (1), and the hardened mold inserts preferably have distinctly higher hardness than the material of the hollow profile.

During the introduction of plastic into the hollow profile (1) in process step e), a pressure is built up within the hollow profile (1), which pushes the outer wall of the hollow profile (1) against the mold contact surfaces (K). The hollow profile (1) itself serves as sprue runner, and as the main distributor channel when the at least one secondary cavity for functional elements (3) in the composite component is likewise being filled with plastic from the inside outward. According to the invention, plastic is introduced into the hollow profile (1) by injection molding.

In an alternative embodiment, in process step e), the plastic is injected through at least one perforation (2) in the hollow profile, wherein only the injection of gas and/or fluid is effected from at least one of the end faces of the hollow profile (1), with overflow of the plastic at the opposite end face in the subsequent process step f).

Functional elements (3) that can be molded on by injection molding by means of the at least one perforation (2) are preferably structures or securing or holding elements for installable components to be mounted or for the composite component itself, especially screw bosses, snap-fit hooks, welding or sealing surfaces, coupling elements for the assembly of pipelines or hoses, bearing sites, axles, housings, housing halves, positioning aids, assembly aids, pegs, studs, cones, rotary, angling and hinge elements for caps, lids or valves, this enumeration being non-conclusive.

Injection Molding

According to DIN 8580, manufacturing processes for production of geometric solid bodies are divided into 6 main groups. Injection molding is assigned to main group 2, primary forming. It is especially suitable for mass-produced articles. Reworking in the case of injection molding is minor or can be dispensed with entirely, and even complicated shapes and outlines can be manufactured in one operation.

Injection molding as a manufacturing method in plastics processing is known in principle to those skilled in the art;

In injection molding, an injection molding machine is used to liquefy or plastify the plastic to be processed and inject it into a mold, the injection mold, under pressure. In the injection mold, also referred to simply as mold in the context of this invention, the plastified plastic is converted back to the solid state as a result of cooling or as a result of crosslinking reaction and, after the opening of the mold, is removed as a finished part. It is the cavity of the mold used that determines the shape and surface structure of the solidified plastic in the final product, in the composite component in the present invention. Nowadays, products in the weight range from a few tenths of a gram up to an order of magnitude of 150 kg are producible by injection molding.

Injection molding, especially extended specific injection molding methods, permits a virtually free choice of shape and surface structure, in particular smooth surfaces, grains for touch-friendly regions, patterns, engravings and color effects. Together with its economic viability, this makes injection molding the most commonly used process for mass production of plastic parts in virtually all sectors.

An injection molding apparatus comprises at least the following components: 1. screw 2. filling funnel 3. pellets 4. plastifying barrel 5. heating elements 6. mold.

The following steps are effected within an injection molding apparatus: 1. plastifying and metering, 2. injecting, 3. maintaining hold pressure and cooling, and 4. demolding.

1. Plastifying and Metering

The thermoplastic to be used with preference for the injection molding in the context of the present invention trickles into the flights of a rotating screw in the form of a granular material. The granular material is conveyed in the direction of the screw tip and is heated and melted by the heat of the barrel and the heat of friction that arises in the division and shearing of the material. The melt collects in front of the screw tip since the exit nozzle is closed at first. Since the screw is axially movable, it retracts as a result of the pressure and screws out of the material like a corkscrew. The backward motion is attenuated by a hydraulic cylinder or by electrical means, such that a backpressure builds up in the melt. This backpressure in conjunction with the screw rotation compresses and homogenizes the plastic to be injected as injection molding material.

The screw position is measured and, as soon as an amount of injection molding material sufficient for the workpiece volume has collected, the metering operation is ended and the screw rotation is stopped. The stress on the screw is likewise actively or passively released, such that the melt is decompressed.

2. Injecting

In the injection phase, the injection unit is moved to the closure unit, the exit nozzle is pressed against it and the screw is put under pressure on the reverse side. This forces the melt under high pressure, preferably at a pressure in the range from 300 to 2000 bar, through the opened exit nozzle and the runner or runner system of the injection mold into the shaping cavity. A nonreturn barrier prevents backflow of the melt in the intake funnel direction.

During the injection, an attempt is made to achieve very substantially laminar flow characteristics of the melt. This means that the melt is immediately cooled in the injection mold where it touches the cooled mold wall and "sticks" in solidified form. The subsequent melt is forced through the resultant narrowing melt channel at even higher velocity and with even more shear deformation and is subjected to expansive deformation at the melt front toward the edge. Removal of heat via the mold wall occurs concurrently with supply of heat through shear heating. The high injection rate produces a shear velocity in the melt that allows the melt to flow more easily. Rapid injection is not the aim since high shear velocities can cause increased molecular degradation within the plastic. The surface of the product to be produced by injection molding, the appearance thereof and ultimately the state of orientation of the plastic molecules are also affected by the injection phase.

3. Maintaining Hold Pressure and Cooling

Since the mold is colder than the plastic material, the mold preferably having a temperature in the range from 20 to 120° C. and the plastic material preferably having a temperature in the range from 200 to 300° C., the melt cools down in the mold and solidifies on attainment of the solidification point of the particular plastic used, preferably of the thermoplastic or thermoplastic-based compound.

Compounding is a term from the plastics industry, synonymous with plastics processing, that describes the process of upgrading plastics by mixing in admixtures (fillers, additives etc.) for specific optimization of the profiles of properties. Compounding is preferably effected in extruders and comprises the process operations of conveying, melting, dispersing, mixing, degassing and pressure buildup. A compound therefore refers to a thermoplastic or thermoset with added fillers or additives.

The cooling on attainment of the solidification point of the plastic used in each case is accompanied by a reduction in volume that has an adverse effect on the trueness to scale and surface quality of the product to be manufactured. In order to partly compensate for this shrinkage, even after the filling of the hollow profile and the at least one secondary cavity, a reduced pressure is also maintained in order that further plastic material can flow in and compensate for the shrinkage. This hold pressure can be maintained until the sprue has solidified.

After the hold pressure phase has ended, the exit nozzle can be closed and the plastifying and metering operation for the next molding can already commence in the injection unit. The plastic material in the hollow profile and in the configuration of the at least one functional element cools down further in the residual cooling time until the center, the liquid core of the plastic, has solidified and achieved a stiffness sufficient for demolding. This operation is also referred to as solidification.

The injection molding unit can then be moved away from the closure unit since no plastic can escape from the sprue any longer. The purpose of this is to prevent transfer of heat from the warmer exit nozzle to the colder sprue.

4. Demolding

For demolding of a composite component having at least one bend and at least one functional element, the cavities are opened and the product is ejected by means of the pins that penetrate into the cavities. The composite component either falls out of the injection mold (bulk material) or is removed from the injection mold by handling devices and laid out in an ordered manner or sent directly to further processing. Preferably, for this purpose, the injection mold is provided with an ejector side.

The sprue inevitably obtained in injection molding either has to be removed by separate processing or is automatically severed in the demolding operation. Sprueless injection molding is also possible with hot runner systems in which the runner system remains constantly above the solidification temperature of the plastic to be used, preferably thermoplastic, thermoset or compound, and the material present can thus be used for the next shot.

Plastics to be Processed by Injection Molding

Plastics to be used for the introduction of plastic into the hollow profile in the injection molding process of the invention are preferably thermoplastics or thermosets, more preferably thermoplastics.

Preferred thermoplastics are polyamides (PA), polybutylene terephthalate (PBT), polyethylene terephthalate (PET), polyethylene (PE), polypropylene (PP) and polyvinyl chloride (PVC). The thermoplastic used for a hollow profile to be used in accordance with the invention is more preferably polyamide or polyester. The polyamide used is preferably a nylon-6. The polyester used is preferably polybutylene terephthalate (PBT) or polyethylene terephthalate, especially PBT. Preferred thermosets are epoxy resins, crosslinkable polyurethanes or unsaturated polyester resins.

The thermoplastic or thermoset is preferably used in the form of a compound.

More preferably, the plastic to be used in process step e) is produced from a thermoplastic with at least one reinforcer. Preference is given to using glass fibers as reinforcer. Especially preferably, reinforcers are used in amounts in the range from 0.1 to 567 parts by mass per 100 parts by mass of the thermoplastic. The reinforcer used is most preferably short glass fibers or long glass fibers. Especially preferably, reinforcers are used in amounts in the range from 10 to 400 parts by mass per 100 parts by mass of the thermoplastic.

Especially preferably, in process step e), glass fiber-reinforced nylon-6 with 10 to 400 parts by mass of glass fibers per 100 parts by mass of polyamide is used in the injection molding process. Compounds of this kind are available under the Durethan® name from Lanxess Deutschland GmbH, Cologne.

It is alternatively possible, in process step e), to use a plastic melt composed of a thermoset. In this case, preference is given to using epoxy resins, crosslinkable polyurethanes and unsaturated polyester resins.

Particular preference is given to using a thermoset in process step e) with at least one reinforcer. In this case, the reinforcer used is preferably glass fibers or carbon fibers, especially glass fibers.

Especially preferably, 10 to 100 parts by mass of glass fibers or carbon fibers as reinforcer are used per 100 parts by mass of the thermoset.

Process Step f)

In process step f), excess plastic is expressed through at least one of the two lateral orifices or end faces of the hollow profile (1) by means of injection of gas or fluid. For this purpose, at least one end face has a gas or fluid injection unit. Preferably, this gas or fluid injection unit is at the opposite end face of the hollow profile with respect to the end face with the injection molding unit. The supply of gas or fluid after the hollow profile has been filled completely pushes plastic material back into the injection molding unit and hence makes it available again in the next cycle. The pressures to be applied in respect of the gas or fluid are in the range from 50 to 500 bar. The process for this gas injection technology (GIT) or fluid injection technology (FIT) is known to the person skilled in the art from DE 100 24 224 B4, or for manufacture of front ends for motor vehicles from DE 10 2011 112 913 A1. Preference is given to using water as fluid, for which the term water injection technology (WIT) is in common use. As a result of process step f), a composite component coated with plastic applied to the wall of the inner surface (7) of the hollow profile (1) is obtained. By contrast with the prior art having externally local application of plastic, the hollow profile (1) and hence the composite component, by the process of the invention, receives stabilization by application of plastic to the wall of the inner surface (7) of the hollow profile over its entire longitudinal axis (L). Composite components of the invention are thus much more stable than composite components according to the above-described prior art.

In a preferred embodiment, it is possible to employ projectile injection technology (PIT), preferably in addition to FIT, in process step f). PIT is a special FIT method in which, with the aid of a projectile injected into the fluid, the still molten or plastified plastic is pushed back out through at least one of the two lateral openings or end faces of the hollow profile to form a cavity. The fluid drives the projectile forward within the plastified plastic. The resulting plastic wall thicknesses are defined exactly and created uniformly by the projectile. The essential features of this process are short cycle times through avoidance of accumulations of material, and constant cavity cross sections along the wall of the inner surface (7) of the hollow profile (1). The possibility of forming tube branches, preferably for formation of functional elements, is maintained. See: Technical article: "Projektil-Injektionstechnik geht in Serie" [Projectile Injection Technology Achieves Mass Production], Kunststoffe November 2006. In the case of PIT, in process step f), gas or liquid is injected only via one of the two lateral openings or end faces of the hollow profile (1). See also DE 10 2014 226 500 A1.

If process step e), in a preferred embodiment, is performed with glass fiber-reinforced nylon-6 containing 15 to 150 parts by mass of glass fibers per 100 parts by mass of polyamide in an injection molding process, a spray pressure in the range from 300 to 1200 bar spec., preferably 500 to 800 bar spec., is employed. The melt temperature of the polyamide molding compound is preferably in the range from 260 to 300° C.; the mold temperature is preferably in the range from 70 to 90° C. The pressure in the hydraulic conduits of an injection molding machine is the hydraulic pressure. The pressure that acts on the plastic melt via the rotating screw is the specific pressure—abbreviated to spec.

Process Step g)

In process step g), the plastic is cooled down, also referred to as solidification. The term "solidification" describes the hardening of the plastified or molten plastic introduced into the hollow profile (1) in process step e) as a result of cooling or chemical crosslinking to give a solid body. The result is a shear-stiff, shear-resistant, highly durable and form-fitting bond at the wall of the internal surface (7) of the hollow profile (1) with direct attachment of at least one functional element (3) which is/are formed in at least one secondary cavity via the exit of the plastic from the hollow profile (1) through at least one perforation (2).

Further details of process step g) have already been described above in the "Maintaining hold pressure and cooling" section.

Process Step h)

In process step h), the finished composite part is removed from the injection mold after, with solidification of the plastics melt, the pressure in the plastic component is no longer present and the closure force has been dissipated with the opening of the injection mold. Further details have already been described above in the "Demolding" section.

Because it is necessary to work with sprue cross sections of generous dimensions for the GIT process, in process step h), there is optionally also removal of such a sprue at least at the point of injection of the plastic and, in one embodiment, also at the opposite end of the gas bubble.

Composite Component

Composite components to be produced in accordance with the invention are used in corresponding configuration preferably for motor vehicle construction, especially in automobile construction. These are preferably bodywork parts, especially cross-car beams (CCBs), also referred to as dashboard crossbeams, front ends, engine bearings, stabilizers, 2-point links, 3-point links, (lateral) shock absorbers, crash elements with structure function, the latter preferably in the doorsill region, fender supports or pedals, this enumeration being incomplete. Dashboard crossbeams are known, for example, from U.S. Pat. No. 5,934,744 A or 8,534,739 B.

In the composite component of the invention, the hollow profile and plastic applied to the inner wall stiffen and reinforce one another. In a preferred embodiment, plastic applied to the outer wall from the inside outward through at least one perforation (2) in the hollow profile (1), especially in bends, additionally serves to stabilize bent composite components. The process of the invention additionally enables the simultaneous configuration of at least one functional element with utilization of the hollow profile as hot runner, and simultaneously permits integration of function in the sense of system or module formation for attachment of plastic structures or plastic surfaces.

Preferred embodiments of a hollow profile (1) for use in accordance with the invention, in addition to the at least one perforation (2), have either beads or similar deformations and/or bores or similar openings.

EXAMPLES

The following parameters are employed for a GIT process in process step f) in experiment V1 on a tubular test injection mold in the form of a hollow profile with Durethan® BKV30 (30% by weight of glass fiber-reinforced nylon-6 from Lanxess Deutschland GmbH, Cologne) as plastic to be used in process step e): injection pressure around 700 bar spec., melt temperature 280° C., mold temperature 80° C., injection rate up to 150 mm/s, cycle time 94 sec.

Gas injection parameters: gas injection delay 3.5 sec., blow out mold at 80 bar for 3 sec, hold gas pressure of 175 bar for 45 sec., gas pressure drop over 20 sec.

GIT Process Procedure Steps:
1. Gas introduction delay
2. Blow out molding at set pressure
3. Buildup/release of gas hold pressure
4. Maintain gas pressure
5. Release gas pressure
6. Remove pressure from molding Experiments V2, V3, V4 and V5 were conducted on a tubular test mold manufactured in the same way as in V1 in the form of a hollow profile with Durethan® BKV30 (30% by weight of glass fiber-reinforced nylon-6 from Lanxess Deutschland GmbH, Cologne) as plastic to be used in process step e) by the WIT process with the WIT process procedure steps of:

1. Buildup of water pressure up to the inlet valve.
2. Introduce water pressure into the molding at set pressure
3. Buildup/release of water hold pressure
4. Maintain water pressure
5. Release water pressure
6. Remove water from molding

TABLE 1

Maximator WIT plant settings:

| | GIT Experiment 1 20 shots | | WIT Experiment 2 Shots 1-10 Melt temperature 285° C. | | WIT Experiment 3 Shots 11-25 Melt temperature 290° C. | | WIT Experiment 4 Shots 26-45 Melt temperature 290° C. | | Experiment 5 Shots 46-82 Melt temperature 290° C. | |
|---|---|---|---|---|---|---|---|---|---|---|
| | Pressure in bar | Time in sec. | Pressure in bar | Time in sec. | Pressure in bar | Time in sec. | Pressure in bar | Time in sec. | Pressure in bar | Time in sec. |
| 1 | 0 | 2.5 | 50 | 4 | 50 | 4 | 50 | 4 | 50 | 4 |
| 2 | 250 | 0.5 | 50 | 2 | 50 | 2 | 50 | 2.5 | 50 | 2.5 |
| 3 | 250 | 2.5 | 200 | 1 | 200 | 1 | 200 | 1.5 | 200 | 1.5 |
| 4 | 150 | 0.5 | 200 | 10 | 200 | 10 | 200 | 10 | 200 | 10 |
| 5 | 150 | 30 | 0 | 1 | 0 | 1 | 0 | 1 | 0 | 1 |
| 6 | 0 | 0.5 | 0 | 25 | 0 | 25 | 0 | 25 | 0 | 25 |
| 7 | 0 | 15 | | | | | | | | |

Wastewater start from step 6

Tab. 1 shows the experimental settings of pressure and pressure profile in the pressure generation unit (from Maximator) for water injection and for gas injection.

TABLE 2

| Core pull | Function | Delay time in sec. | | | | | Pressure |
|---|---|---|---|---|---|---|---|
| | | V1 | V2 | V3 | V4 | V5 | |
| 1 | Large blowout cavity | 0.5 | 1 | 1 | 1.5 | 1 | 40% (56 bar) |
| 2 | Small blowout cavity | 1 | 1.5 | 1.5 | 2 | 1.5 | 40% (56 bar) |
| 3 | Sprue gate | 35 | 25 | 25 | 25 | 25 | 100% (140 bar) |

Tab. 2 shows the experimental parameters of hydraulic pressure (<Pressure>) and time (<Delay time>) for the actuation of the core pulling systems that control the 2 blowout cavities and the sprue gate.

Materials Used:
Material 1: Durethan® KU2-2224/30 H2.0, Pt.30CD4C0560; Fb.900116
Material 2: Durethan® KU2-2224/30 H2.0, Pt.30CD2N0630; Fb.901510
Material 3: Durethan® KU2-2224/30 H2.0, JADE 3576 B Material 1 was compared in the GIT and WIT methods. Materials 2 and 3 were compared with one another in the WIT method. Table 1 describes the assignment of materials to the respective experiments under Comments.

Comments on GIT Settings:

Variation in the set parameters for the GIT plant did not bring any improvement in the inner surface of the GIT tube. It was possible to run a fully automated cycle with uniform quality.

Comments on WIT Settings:

The shortest cycle time was achieved with the WIT setting for V5 of the experimental protocol. Gate formation at the distributor was much rarer with the materials from V3 and V4. There was no observation here of material rejected as a result of large separate gas bubbles. It was possible to run a fully automated cycle.

What is claimed is:

1. A process for producing a composite component, the process comprising:
    a) providing an injection mold having at least one openable cavity and a mold dimension (A) in closure direction and a mold dimension (B) at right angles to the closure direction of the mold and a cavity circumference (UW) corresponding to the circumference of the cavity in the region of mold dimensions (A) and (B), and at least one secondary cavity,
    b) providing at least one hollow profile in the form of a hollow cylinder having
        i) the hollow profile circumference (UH), the wall thickness(S), the external diameter (C) and the longitudinal axis (L),
        ii) at least one bend with angle (W) and
        iii) at least one perforation along its longitudinal axis (L),
        and in unbent regions of the hollow profile,
        iv) having a ratio of external diameter (C) to wall thickness(S) in the range from 5:1 to 300:1, where the external diameter (C) in the region of the mold contact surfaces (K) is greater by a range from 0.1% to 5% than the mold dimension (A) and is less by a range from 0.1% to 5% than the mold dimension (B), and
        v) the figures for external diameter (C) are based on 90° viewed in the direction of the longitudinal axis (L) of the hollow profile, and
        vi) the hollow profile circumference UH=C·π corresponds to the cavity circumference (UW) of the at least one injection mold cavity in the closed state, and
        vii) the mold contact surfaces refer to the sealing surfaces of the mold in the closed state with the hollow profile,
    c) introducing the at least one hollow profile into the at least one cavity of the injection mold,
    d) closing the at least one cavity of the injection mold and compressing the hollow profile at its mold contact surfaces in closure direction of the at least one cavity,
    e) injecting plastic into the interior of the hollow profile while the at least one cavity is closed and the hollow profile is compressed, and simultaneously filling the at least one secondary cavity via the at least one perforation in the hollow profile,
    f) expressing an excess of the plastic injected into the interior under step e) through at least one of the two lateral openings in the hollow profile by injecting gas and/or fluid thereby rendering the hollow profile with a remnant coating of the plastic on an inner surface thereof and a hollow bore,
    g) cooling down the plastic melt introduced into the hollow profile and into the secondary cavity in e), and
    h) removing the finished composite component from the injection mold and optionally removing sprues,
    with the proviso that the figures for mold dimension (A), for mold dimension (B) and for cavity circumference (UW) in process step a) relate to regions of the injection mold in which unbent regions of the hollow profile lie, and the hollow profile is based on metal or on a composite.

2. The process as claimed in claim 1, wherein the at least one perforation is introduced before, during or after process step b) in the form of at least one hole or bore from outside into the wall of the hollow profile at positions where at least one functional element is provided.

3. The process as claimed in claim 1, further comprising assisting by additional measures the bonding of a functional element simultaneously fashioned by means of injection of plastic into the hollow profile to the hollow profile.

4. The process as claimed in claim 3, wherein the additional measures comprise the introduction of beads, holes, bores into the hollow profile wall or the application of additional anchoring elements.

5. The process as claimed in claim 1, wherein the metal is steel, aluminum or alloys of aluminum.

6. The process as claimed in claim 1, wherein the hollow profile has a circular or elliptical cross section, where an elliptical cross section varies by not more than 10% from a circular cross section.

7. The process as claimed in claim 1, wherein the hollow profile has a wall thickness(S) in a range from 0.1 to 10.0 mm.

8. The process as claimed in claim 1, wherein the hollow profile has a longitudinal axis (L) in a range from 60 to 2000 mm.

9. The process as claimed in claim 1, wherein the production of the hollow profile uses at least one material selected from the group consisting of metals, alloys, thermoplastics and thermosets.

10. The process as claimed in claim 9, wherein the metals comprise steel, aluminum, magnesium, titanium, tin, zinc, lead, silver, gold, brass or alloys, and wherein the thermoplastics comprise polyamides, polyalkylene terephthalates, polyethylene, polypropylene or polyvinylchloride, and wherein the thermosets comprise epoxy resins, crosslinkable polyurethanes or unsaturated polyester resins.

11. The process as claimed in claim 10, wherein the polyamide is nylon-6 and the polyalkylene terephthalate is polybutylene terephthalate or polyethylene terephthalate.

12. The process as claimed in claim 10, wherein the thermoplastics include a thermoplastic comprising at least one reinforcer.

13. The process as claimed in claim 12, wherein the hollow profile is a thermoplastic-based composite in which the reinforcer is comprised essentially of weaves or scrims of fiber mats.

14. The process as claimed in claim 1, further comprising introducing the at least one perforation before, during or after process step b) in the form of multiple holes or bores from outside into the wall of the hollow profile at positions where at least one functional element is provided.

15. The process as claimed in claim 10, which comprises using a thermoplastic with one or more reinforcers in amounts in a range from 10 to 400 parts by mass per 100 parts by mass of the thermoplastic.

16. The process as claimed in claim 13, wherein the fiber mats are glass fiber mats based on longitudinal glass fibers or continuous glass fibers.

* * * * *